United States Patent [19]
Yoshida et al.

[11] Patent Number: 5,936,596
[45] Date of Patent: *Aug. 10, 1999

[54] TWO-DIMENSIONAL IMAGE DISPLAY DEVICE AND DRIVING CIRCUIT

[75] Inventors: Shigeto Yoshida, Tenri; Hiroshi Yoneda, Ikoma; Minehiro Konya, Daito, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/523,090

[22] Filed: Sep. 1, 1995

[30] Foreign Application Priority Data

| Sep. 2, 1994 | [JP] | Japan | 6-210213 |
| Sep. 13, 1994 | [JP] | Japan | 6-219167 |
| Aug. 15, 1995 | [JP] | Japan | 7-208114 |

[51] Int. Cl.⁶ ................................... G09G 5/00
[52] U.S. Cl. ............................. 345/9; 345/87
[58] Field of Search ................ 345/6, 4, 87, 32, 345/90, 84, 97, 5, 9, 30, 31; 349/57, 78, 8, 15; 359/22, 23; 358/88; 348/59, 55

[56] References Cited

U.S. PATENT DOCUMENTS

| 4,571,616 | 2/1986 | Haisma et al. | 358/88 |
| 5,049,987 | 9/1991 | Hoppenstein | 358/88 |
| 5,113,272 | 5/1992 | Reamey | 345/4 |
| 5,300,942 | 4/1994 | Dolgoff | 345/32 |
| 5,408,344 | 4/1995 | Takiguchi et al. | 349/57 |
| 5,410,345 | 4/1995 | Eichenlaub | 348/59 |
| 5,483,254 | 1/1996 | Powell | 345/87 |
| 5,521,724 | 5/1996 | Shires | 359/22 |
| 5,598,229 | 1/1997 | Okada et al. | 345/97 |
| 5,615,027 | 3/1997 | Kuribayashi et al. | 345/87 |

FOREIGN PATENT DOCUMENTS

| 60-233623-A | 11/1985 | Japan . |
| 62-065580-A | 3/1987 | Japan . |

OTHER PUBLICATIONS

English abstract of Kurikawa/Toshiba JP 60–233623–A, publ. Nov. 20, 1985.
English abstract of Atsuta+/Kawasaki JP 62–065580–A, publ. Mar. 24, 1987.

*Primary Examiner*—Chanh Nguyen
*Assistant Examiner*—John Suraci
*Attorney, Agent, or Firm*—Dike, Bronstein, Roberts & Cushman, LLP; David G. Conlin

[57] ABSTRACT

An image-displaying apparatus that is provided with a display section which is constituted of a plurality of pixels disposed in the form of a matrix and which is capable of displaying images that are different depending on viewing angles from which they are viewed. This arrangement makes it possible to select desired images by changing the viewing angles from which the display section is viewed. This eliminates the necessity of having to wear conventional glasses with a shutter and their inherent inconveniences. Further, this apparatus is suitable for public use as well as for private use, even when only one apparatus is used.

42 Claims, 17 Drawing Sheets

TWO-DIMENSIONAL IMAGE DISPLAY DEVICE AND DRIVING CIRCUIT

FIELD OF THE INVENTION

The present invention relates to an image-displaying apparatus, and more specifically concerns an image-displaying apparatus that is capable of displaying a plurality of images at the same time.

BACKGROUND OF THE INVENTION

In prior approaches to displaying a plurality of images on a single TV screen, the screen is divided into a main screen and a sub-screen that is placed in the main screen as shown in FIGS. 22(a) and 22(b). For this reason, the main screen becomes devoid of its partial image, and the sub-screen tends to have images that are too small to be discernible.

In order to solve this problem, Japanese Laid-Open Patent Publication, No. 65580/1987 (Tokukaishou 62-65580), has proposed a multi-displaying system wherein a plurality of programs are displayed on the entire screen of a single television virtually at the same time in a time-sharing manner using sequentially identical cycles, and special-purpose glasses with a shutter that opens and closes in synchronism with one of the cycles are used for viewing the screen. This arrangement allows each of the viewers to select a desired program from those programs and also to view images of the desired program in a manner displayed on the entire screen.

However, the problem with the above-mentioned conventional arrangement is that the necessity of the special-purpose glasses causes inherent inconveniences.

Further, another problem is that flickers tend to occur because a plurality of programs are displayed in the time-sharing manner.

As for portable display terminals, various usages are proposed for a variety of occasions. For example, such a terminal may be used in a commuting train so as to confirm highly classified information, or may be used at a meeting so as to publicize information to all the attendants. In the former case, such a display terminal having a narrow viewing-field angle is preferably used because of the necessity of hiding the information from other people, while in the latter case, such a display terminal having a wide viewing-field angle is preferably used. For this reason, in the conventional portable display terminals, it is necessary to possess two display terminals of different types.

SUMMARY OF THE INVENTION

One objective of the present invention is to provide an image-displaying apparatus which allows people to select a desired image from a plurality of images without using special-purpose glasses. Another objective of the present invention is to provide an image-displaying apparatus which is applicable to public use as well as private use even when only one apparatus is used.

(1) The image-displaying apparatus is characterized by having a display section which is constituted of a plurality of pixels disposed in the form of a matrix and which is capable of displaying images that are different depending on viewing angles from which they are viewed.

With this arrangement, it is possible to select desired images by changing the viewing angles from which the display section is viewed. This eliminates the necessity of having to wear conventional glasses with a shutter and their inherent inconveniences.

(2) The image-displaying apparatus is characterized by having a display section which is constituted of a plurality of pixels disposed in the form of a matrix and which is changeable in its viewing-field angle.

With this arrangement, the display section can be changed to have a narrow viewing-field angle in such locations as public places so that the surrounding people can hardly view the image information, and the display section can also be changed to have a wide viewing-field angle in places such as meetings so that many people can view the image information. Therefore, the application of this image-displaying apparatus to portable display terminals enables even a single portable display terminal to be used in various purposes.

(3) The image-displaying apparatus, as described in (1) or (2), is provided with a control means for controlling the viewing-field angles of the pixels.

In addition to the functions of (1) or (2), this arrangement makes it possible to control the viewing-field angles of the picture elements. Thus, it becomes possible to make the apparatus more convenient since no replacing process for the display sections is required upon changing the viewing-field angles.

(4) The image-displaying apparatus, as described in (1) through (3), is designed so that each pixel of at least one portion is constituted of a plurality of different sub-pixels that have viewing angles different from each other.

In addition to the functions of (1) through (3), this arrangement makes the resolution of the display section constant irrespective of the presence or absence of the sub-pixels; therefore, it is possible to prevent loss of display information in every part of the display section. Further, with a modification of the arrangement, it is possible to provide shared use of picture signal lines for sending picture data to the respective sub-pixels, scanning signal lines, and other lines. As a result, it becomes possible to easily write picture signals to the respective sub-pixels.

(5) The image-displaying apparatus, as described in (4), is designed so that the contents of images displayed on the respective sub-pixels can be freely selected between the same contents and different contents.

In addition to the functions and effects of (4), this arrangement makes it possible to change the contents of display depending on angles from which the screen is viewed. Further, with a modification of the arrangement, it is possible to reduce the size and the number of elements of external circuits.

(6) The image-displaying apparatus, as described in (4), is designed so that the structure of the sub-pixels is identical in all the pixels.

In addition to the functions and effects of (4), this arrangement provides uniform display quality irrespective of angles from which the screen is viewed.

(7) The image-displaying apparatus, as described in (1) through (3), is designed so that the display section includes pixels having different viewing angles.

In addition to the functions and effects of (1) through (3), in this arrangement, at least one portion of the screen is set to have a narrow viewing-field angle so that the surrounding people are hardly allowed to view the image information of said portion of the screen, and the rest of the screen is set to have a wide viewing-field angle so that the surrounding people are allowed to view the image information of the rest of the screen. Alternately, at least one portion of the screen is changed to have a viewing-angle direction that is different from the viewing-angle direction of the other portions so that specific people are allowed to view specific information. Thus, it becomes possible to apply a single unit of this displaying apparatus to not less than two usages at the same time.

(8) The image-displaying apparatus, as described in (7), is designed so that pixel groups, each consisting of pixels having the same viewing angle, are provided, and that the viewing angle of the pixels belonging to any pixel group is different from that of the pixels belonging to the other pixel groups.

In addition to the functions and effects of (7), this arrangement makes it possible to provide states of viewing-angles that are different from each other depending on the respective pixel groups.

(9) The image-displaying apparatus, as described in (8), is designed so that the pixels have the same disposition in the respective pixel groups.

In addition to the functions and effects of (7), this arrangement makes it possible to provide uniform display quality.

(10) The image-displaying apparatus, as described in (9), is designed so that the viewing angles of adjacent pixels are different from each other.

In addition to the functions and effects of (9), this arrangement allows the display regions of the respective pixel groups to have virtually the same size, and also makes the most of the full screen size.

(11) The image-displaying apparatus, as described in (4) through (10), is designed so that the pixels or sub-pixels having the different viewing angles are constituted of reflection plates, each of which is installed in each pixel or sub-pixel and reflects light from the pixel or the sub-pixel.

In addition to the functions and effects of (4) through (10), this arrangement makes it possible to readily change the pixels having the different viewing angles.

(12) The image-displaying apparatus, as described in (11), is characterized in that the reflection plate is divided into a plurality of portions.

In addition to the functions and effects of (11), this arrangement provides uniform display quality within the respective viewing-field angles.

(13) The image-displaying apparatus, as described in (4) through (10), is designed so that each of the pixels or sub-pixels that have the different viewing angles is constituted of liquid crystal, which is placed in each pixel or sub-pixel and which scatters or transmits light from the pixel or the sub-pixel, and a voltage-applying means that changes the state of the liquid crystal by applying voltage to the liquid crystal.

In addition to the functions and effects of (4) through (10), this arrangement makes it possible to change the viewing angle without lowering the resolution, brightness and other factors.

(14) The image-displaying apparatus, as described in (10), is designed so that the liquid crystal and the voltage-applying means are formed on the same substrate.

In addition to the functions and effects of (10), this arrangement achieves the compactness of the apparatus, reduction in the packaging costs, and improved reliability of the apparatus.

(15) The image-displaying apparatus, as described in (1) through (14), is designed so that each of the pixels is connected between each data signal line and each scanning signal line, and is provided with a scanning driver for successively selecting scanning signal lines and a data driver for releasing image signals to data signal lines. The pixels, the scanning driver and the data driver are monolithically formed on the same substrate.

In addition to the functions and effects of (1) through (14), this arrangement makes it possible to simplify the interface to external devices, as well as achieving the compactness of the apparatus, reduction in the packaging costs, and improved reliability of the apparatus. Moreover, since this arrangement actually solves the problem of packaging pitch, that is, the technical restriction that is imposed when packaging ICs on the panel, it becomes possible to shorten the size of the pixels or sub-pixels, thereby achieving displays with high display quality and high precision.

(16) The image-displaying apparatus is provided with: a display section which is constituted of a plurality of pixels disposed in the form of a matrix, with the pixels divided into a plurality of pixel groups; and a driving means for sending image signals to the respective pixel groups. Each pixel group is constituted of pixels having the same viewing angle, and the viewing angle of the pixels belonging to any pixel group is different from that of the pixels belonging to the other pixel groups.

With this arrangement, it is possible to display different images on the respective pixel groups. Further, since each pixel group is constituted of pixels having the same viewing angle, and since the viewing angle of the pixels belonging to any pixel group is different from that of the pixels belonging to the other pixel groups, desired images can be selected by simply changing places from which the display section is viewed. This eliminates the necessity of having to wear conventional glasses with a shutter and their inherent inconveniences.

Moreover, if each pixel is constituted by three picture elements, R, G and B, it is possible to display color images on the respective pixel groups.

(17) The image-displaying apparatus, as described in (16), is designed so that the regions of the respective pixel groups are disposed in an overlapping manner with one another.

In addition to the functions and effects of (16), in this arrangement, large areas can be maintained for the respective pixel groups even if the number of the pixel groups is increased; this allows to display large images.

(18) The image-displaying apparatus, as described in (16), is designed so that the regions of the respective pixel groups are disposed in a separate manner from one another.

In addition to the functions and effects of (16), this arrangement eliminates the possibility of respective images being viewed in an overlapped manner, from whichever position the display section is viewed. This makes it possible to always provide accurate image information.

(19) The image-displaying apparatus, as described in (18), is designed so that the display section is provided with, at least, a pixel group disposed in the center and pixel groups disposed on both sides thereof, and the viewing-field angle of the pixel group disposed in the center is set to be wider than that of the pixel groups disposed on both sides thereof.

In addition to the functions and effects of (18), this arrangement provides a display section which is suitable for usages, such as games. In other words, when a game is played by a group of people, shared information can be displayed on the pixel group in the center, while personal information, which has to be hidden from the other people, can be displayed on the pixel group on either side.

(20) The image-displaying apparatus, as described in (16) through (19), is designed so that the driving means includes a control circuit for releasing image signals to the respective pixel groups in a time-sharing manner.

In addition to the functions and effects of (16) through (19), this arrangement enables shared use of circuits for driving the pixel groups. Therefore, the number of parts can be reduced. As a result, the reliability is improved, the cost of packaging is reduced, and the compactness and light-weight of the apparatus is achieved.

(21) The image-displaying apparatus, as described in (16) through (20), is designed so that each pixel is made up of a liquid crystal element, and that the driving means includes a means which applies driving voltages, each having a reversed polarity, to adjacent liquid crystal elements in the respective pixel groups.

In addition to the functions and effects of (16) through (20), since each pixel is made up of a liquid crystal element, this arrangement makes it possible to readily achieve pixels having different viewing angles. Further, since the driving means includes the means which applies driving voltages, each having a reversed polarity, to adjacent liquid crystal elements in the respective pixel groups, this arrangement makes it possible to suppress the influence of dc-current shifts in the driving voltage of the liquid crystal elements. Thus, it becomes possible to reduce the generation of flickers.

(22) The image-displaying apparatus, as described in (16) through (20), is designed so that the driving means includes a signal-switching means for inputting an image signal of the same system to a plurality of pixel groups.

In addition to the functions and effects of (16) through (20), this arrangement makes it possible to display the same image on the pixel groups having different viewing-angle directions. Thus, a plurality of viewers can watch the same program; that is, it is possible to share the same information.

(23) The image-displaying apparatus, as described in (22), is designed so that the signal-switching means is monolithically formed on the substrate.

In addition to the functions and effects of (22), since the number of parts is reduced and since the substrate, which has the display section, is used more effectively, it becomes possible to further achieve the compactness and light-weight of the apparatus.

(24) The image-displaying apparatus, as described in (22), is designed so that the driving means includes a data driver which is capable of driving a plurality of pixel groups by using a shift register of only one system.

In addition to the functions and effects of (22), this arrangement makes it possible to reduce the number of shift registers; therefore, the driving circuit is simplified, the area for the elements is reduced, and the compactness and high reliability of the apparatus are achieved.

(25) The image-displaying apparatus, as described in (18), is designed so that the driving means includes a data driver for driving the pixel groups and an image signal from one system is inputted to the data driver.

In addition to the functions and effects of (18), depending on a specific position on the time axis of the picture signal, this arrangement provides a different viewing position around the screen from which the contents of the signal can be viewed; therefore, even in the case of using a video signal from one system, it is possible to transmit specific information only to specific people. Moreover, since the construction of the apparatus is simplified, the reliability is improved, the cost of packaging is reduced, and the compactness and light-weight of the apparatus is achieved.

Moreover, in the image-displaying apparatus as described in (24) and (25), the data driver may be monolithically formed on the substrate.

(26) The image-displaying apparatus is provided with: a display section which is constituted of a plurality of pixels disposed in the form of a matrix, a changing means for changing the viewing-field angle of the pixels, and a driving means for sending image signals to the display section. Here, each pixel is made up of a liquid crystal element, and the changing means controls the viewing-field angle by switching voltages to be applied to the liquid crystal elements in a step-wise manner.

With this arrangement, in locations such as public places, information can be displayed by making a change to the pixels having a narrow viewing-field angle so that the surrounding people are hardly allowed to view the information, and in places such as meetings, the information can also be displayed by making a change to the pixels having a wide viewing-field angle so that many people can view the information. Moreover, since each pixel is made up of a liquid crystal element, it is possible to achieve a light-weight image-displaying apparatus with small power consumption. Furthermore, since the changing means controls the viewing-field angle by switching voltages to be applied to the liquid crystal elements in a step-wise manner, it is possible to easily switch the viewing-field angle with respect to the entire screen.

(27) The image-displaying apparatus is provided with: a display section which is constituted of a plurality of pixels disposed in the form of a matrix and a driving means for sending image signals to the display section. Here, the display section is exchangeably installed so as to change the viewing-field angle of the pixels.

This arrangement makes it possible to change the viewing-field angle by exchanging the display sections.

For a fuller understanding of the nature and advantages of the invention, reference should be made to the ensuing detailed description taken in conjunction with the accompanying drawings.

BRIEF DESCRIPTION OF THE DRAWINGS

FIG. 16(a) shows a case where a scanning-signal line is switched, and FIG. 16(b) shows a case where a data-signal line is switched.

FIG. 18(a) shows a state of a narrow viewing-field angle, and FIG. 18(b) shows a state of a wide viewing-field angle.

FIG. 19(a) shows a state of a narrow viewing-field angle, and FIG. 19(b) shows a state of a wide viewing-field angle.

FIG. 22(a) shows a TV screen having one sub-screen in the main screen, and FIG. 22(b) shows a TV screen having two sub-screens in the main screen.

DESCRIPTION OF THE EMBODIMENTS

Referring to FIGS. 1 through 17 as well as FIGS. 23 through 29, the following description will discuss one embodiment of the present invention.

Figure 1:
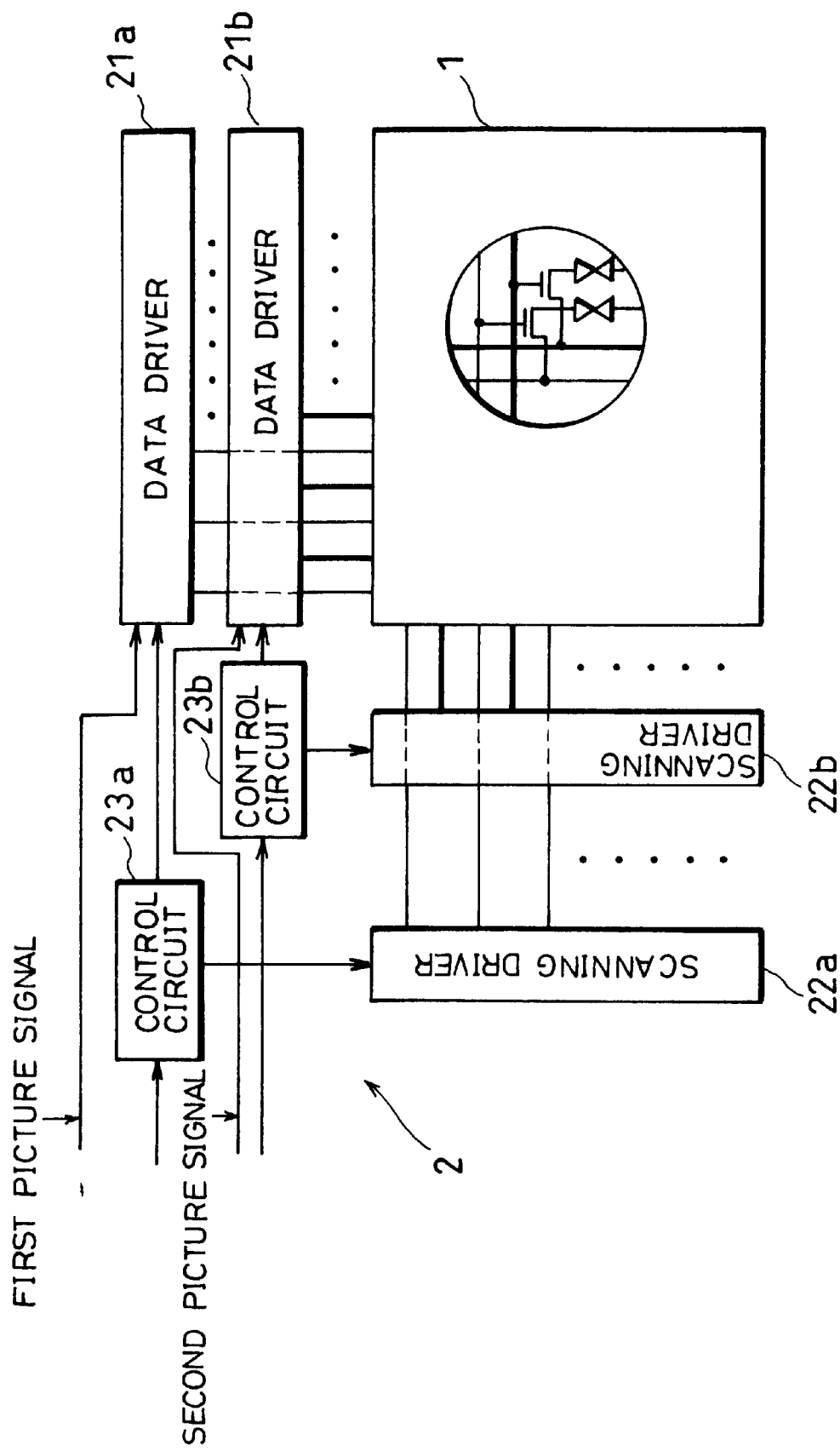
FIG. 1, which shows one embodiment of the present invention, is a block diagram showing an arrangement of a liquid crystal display.

As illustrated in FIG. 1, a liquid crystal display in accordance with the present embodiment is provided with a display section 1 and a driving circuit 2 (driving means) for driving the display section 1.

Figure 2:
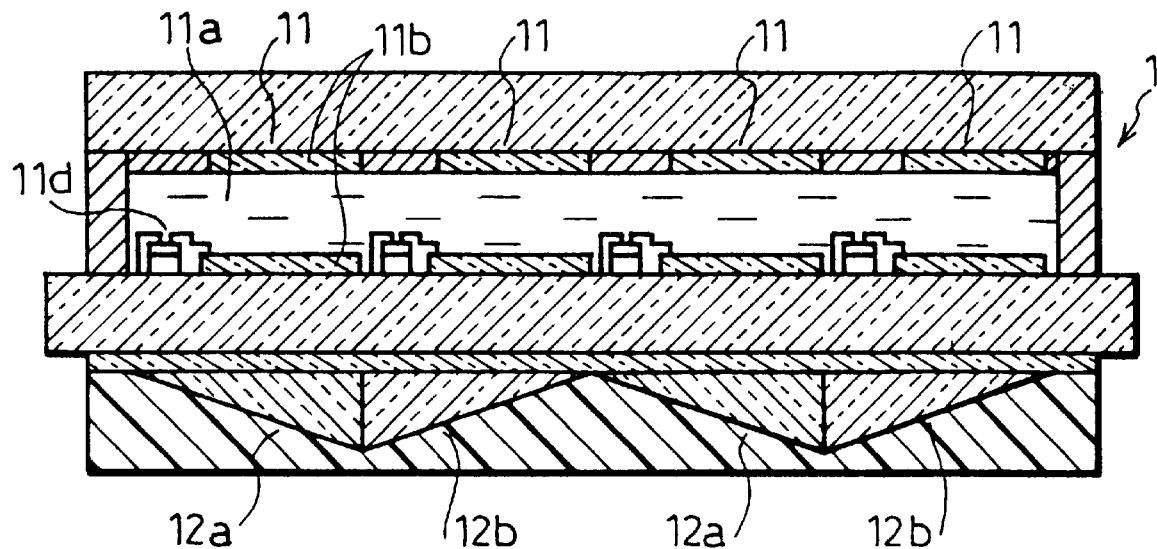
FIG. 2 is a vertical cross-sectional view showing one example of a display section in the liquid crystal display of FIG. 1.

As illustrated in FIG. 2, the display section 1 is constituted of a plurality of liquid crystal elements 11 that are placed in the form of a matrix and micro-lenses 12a and 12b that are alternately disposed at positions corresponding to the respective liquid crystal elements 11. Each liquid crystal element 11 has a construction wherein liquid crystal 11a is sandwiched by transparent electrodes 11b, and a switching transistor 11d for active-driving use is added to the construction, if necessary. Each micro-lens 12a has a triangular shape in its cross-section so that the viewing angle of the liquid crystal elements 11 is set to a desired angle of $+\phi$, and each micro-lens 12b has also a triangular shape in its cross-section that is reversed to that of the micro-lens 12a so that the viewing angle of the liquid crystal elements 11 is set to a desired angle of $-\phi$. In this case, the viewing angle is an angle from which light from the liquid crystal elements 11 is viewed most clearly, and is indicated by an angle made with respect to the normal of the display section 1.

A group of pixels consisting of the liquid crystal elements 11 and the micro-lens 12a constitutes the first pixel group, and a group of pixels consisting of the liquid crystal elements 11 and the micro-lens 12b constitutes the second pixel group.

Next, an explanation will be given on the driving circuit 2 that drives these pixel groups, but prior to the explanation on the driving circuit 2, the following description will discuss a widely used driving circuit by reference to an active-matrix-type display as an example.

Figure 23:
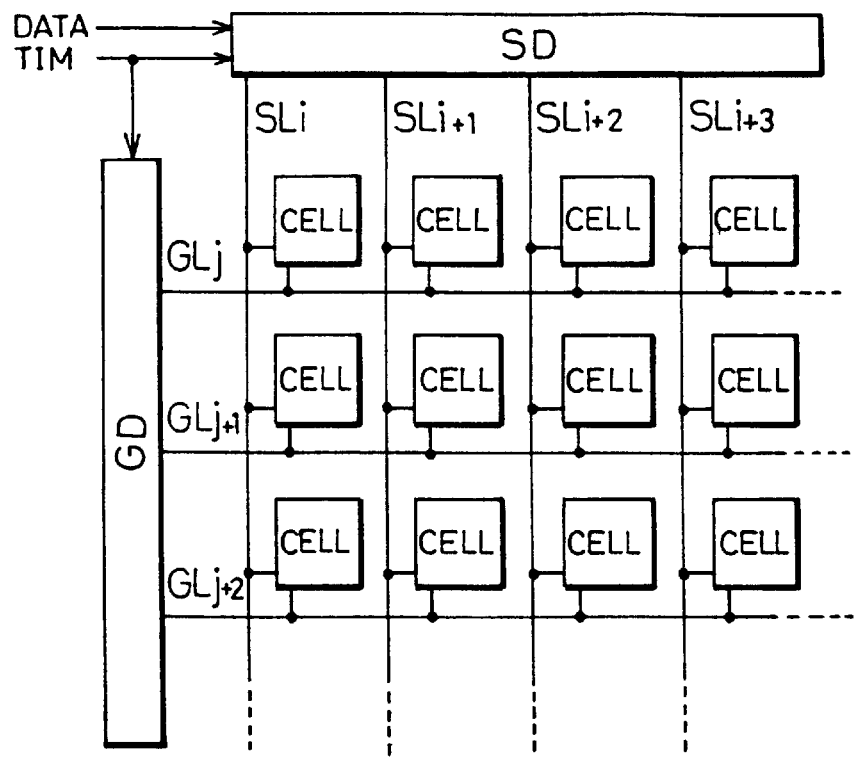
FIG. 23 is a block diagram showing a widely used arrangement of an active-matrix-type liquid crystal display.

As illustrated in FIG. 23, this image-displaying apparatus is constituted of a pixel array, a scanning-signal-line driving circuit GD and a data-signal-line driving circuit SD. In the pixel array, a number of scanning-signal lines GL and a number of data-signal lines SL are disposed with the scanning-signal lines GL and the data-signal lines SL intersecting each other, and pixel CELLs are placed in portions each of which is enclosed by the adjacent two scanning-signal lines GL and the adjacent two data-signal lines SL, in the form of a matrix.

The data-signal-line driving circuit SD samples an inputted picture signal DATA in synchronism with a timing signal TIM, amplifies the sampled signal, if necessary, and writes it to the respective data-signal lines SL. The scanning-signal-line driving circuit GD selects the scanning-signal lines GL successively in synchronism with the timing signal TIM, and writes the data (picture signal), which has been written to the respective data-signal lines SL, to the respective pixel CELLs, as well as holding the data written to the respective pixel CELLs, by controlling the opening and closing of switching devices disposed in the pixel CELLs.

Figure 24:
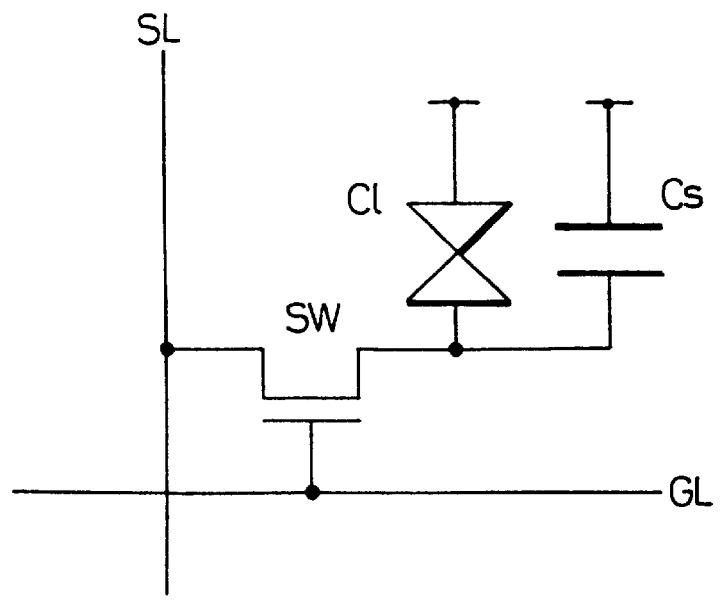
FIG. 24 is a circuit diagram showing a constitution of pixels in the liquid crystal display of FIG. 23.

As shown in FIG. 24, each pixel CELL is constituted of a switching device SW, such as an MOSFET (field-effect transistor), and a pixel capacitor (which consists of a liquid crystal capacitor C1 and an auxiliary capacitor Cs that is added thereto, if necessary). Each data-signal line SL is connected to one of the electrodes of the pixel capacitor through the drain and source of the transistor which functions as the switching device SW, the gate of the transistor is connected to each scanning-signal line GL, and the other electrode of the pixel capacitor is connected to a common electrode line which is commonly used by all the pixels. Thus, the transmittance or reflectance of the liquid crystal is modulated by a voltage that has been applied to each liquid crystal capacitor C1 so that images are displayed.

The point-sequential driving method and the line-sequential driving method are typically listed as the data-driving methods.

Figure 25:
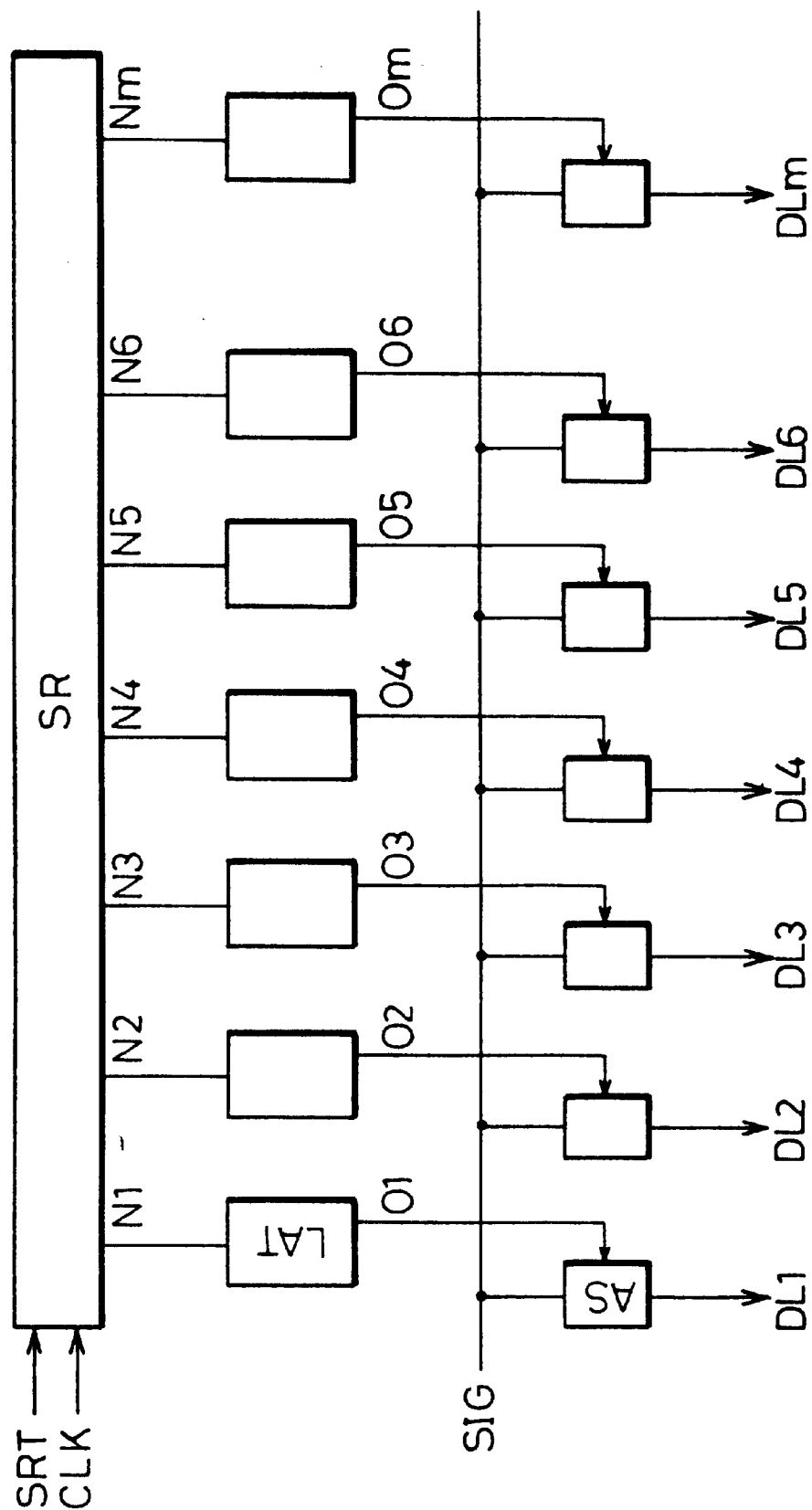
FIG. 25 is a block diagram showing an arrangement of a data-signal-line driving circuit which carries out a point-sequential driving operation in the liquid crystal display of FIG. 23.

As shown in FIG. 25, in the point-sequential driving method, a picture signal, inputted to a picture-input signal line SIG, is written to the data-signal lines SL, by opening and closing a sampling switch AS in synchronism with output pulses from the respective stages of a shift register SR. Here, AS represents a sampling circuit, and it amplifies the signal from the shift register SR, and generates an inversion signal, if necessary. In this method, the time that allows the picture signal to be written to the data-signal lines SL is only as short as a 1/[the number of the data lines of an effective horizontal scanning period (approximately 80% of the horizontal scanning period)]. Therefore, when the time constant (product of capacity and resistance) of the data signal lines is made greater in order to meet the current demands for large screens, it is difficult to maintain a sufficient writing process, thereby causing adverse effects on the quality of displayed images. In particular, this problem is aggravated when the sampling switch AS is constituted of transistors with low driving performance. Therefore, the channel width of the transistors constituting the sampling switch AS is set to be greater in order to maintain a sufficient writing performance.

Figure 26:
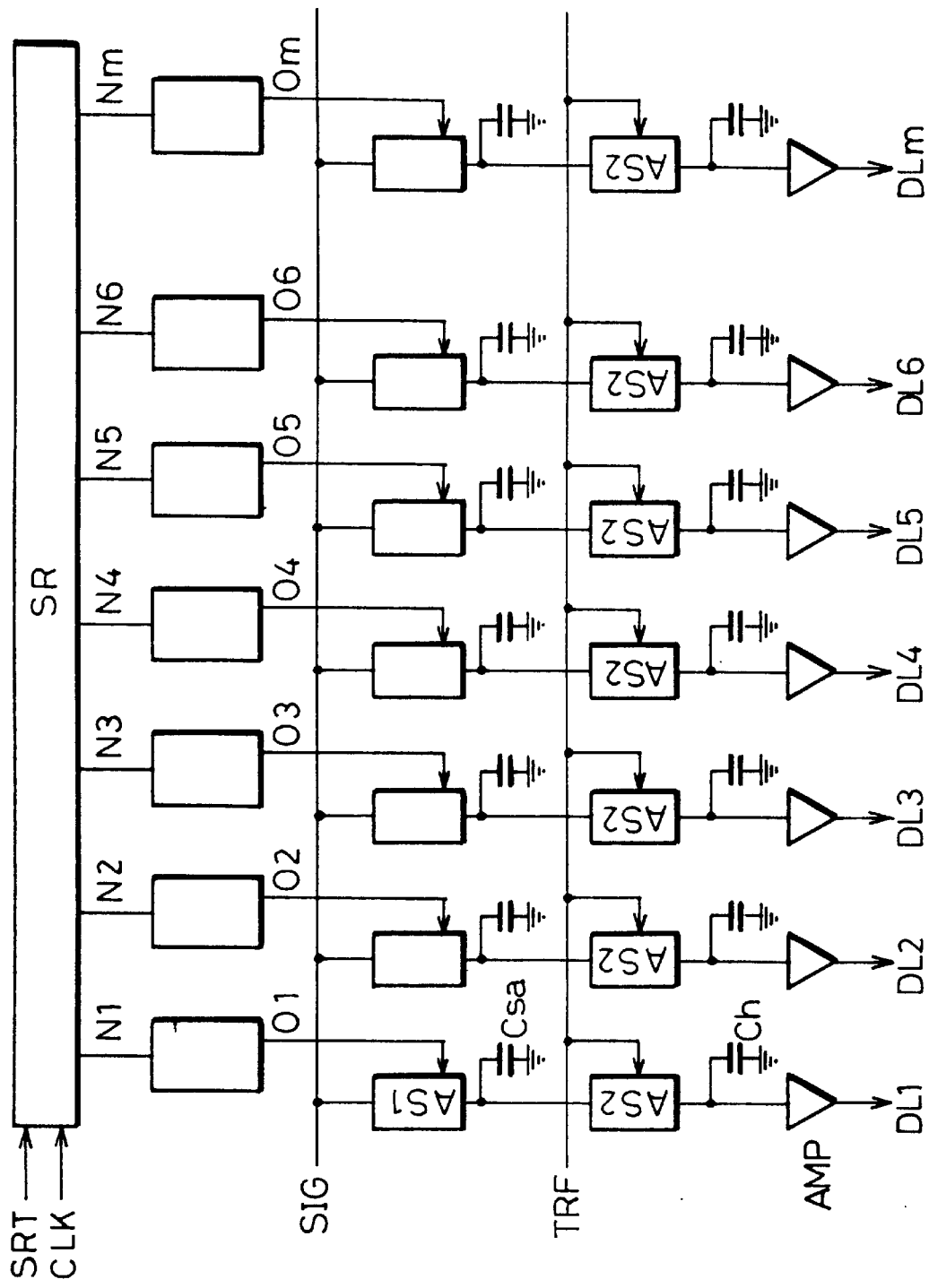
FIG. 26 is a block diagram showing an arrangement of a data-signal-line driving circuit which carries out a line-sequential driving operation in the liquid crystal display of FIG. 23.

In contrast, as shown in FIG. 26, in the line-sequential driving method, the picture signal, which has been temporarily stored in a sampling capacitor Csa, is outputted to the data-signal lines SL through a buffer (an operational amplifier) AMP during the next horizontal scanning period. In general, since the sampling capacitor Csa is smaller than the capacity of the data signal line SL, the line-sequential driving method makes it possible to shorten the writing time from the picture-input signal line SIG, and also to use the horizontal scanning period for the writing operation to the data-signal line with relatively large loads. This allows a sufficient writing process to the data signal lines SL, and the line-sequential driving method has less problems than the point-sequential driving method. However, the disadvantage of the line-sequential driving method is that the electric charge held in the sampling capacitor Csa decreases due to leakage current in the sampling switch AS1 and AS2 as time elapses and it also decreases due to divided capacities upon transferring data to the buffer AMP. In order to suppress these adverse effects, it is proposed that the sampling capacity be increased; however, this might cause an insufficient writing process in the same manner as caused in the point-sequential driving method. Therefore, in this case also, it is necessary to increase the channel width of the transistors constituting the sampling switches AS1 and AS2 in order to maintain a sufficient writing performance.

Figure 27:
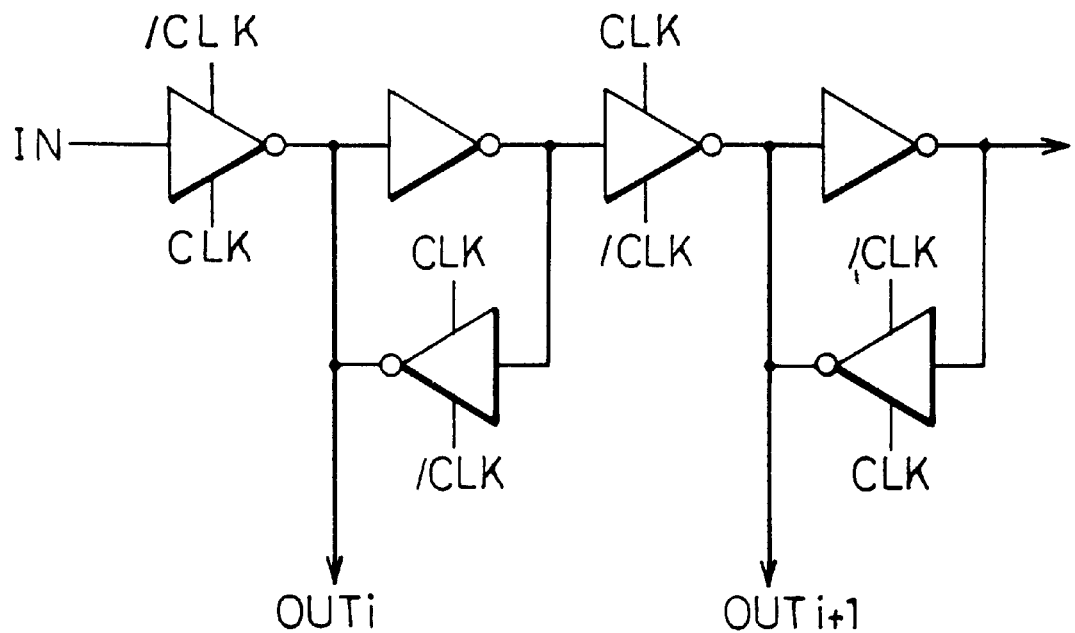
FIG. 27 is a circuit diagram showing an arrangement of a shift register in the data-signal-line driving circuit of FIG. 26.
Figure 28:
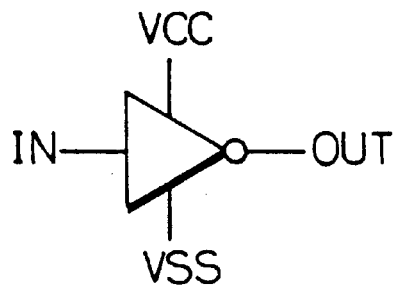
FIG. 28(a) is a drawing that shows an inverter in the shift register of FIG. 27.
FIG. 28(b) is a circuit diagram showing the internal structure of FIG. 28(a).
Figure 28:
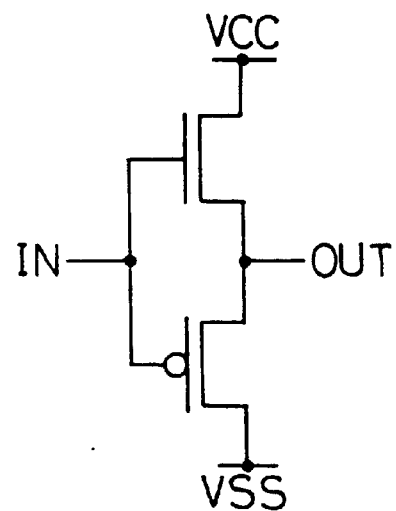
Figure 29:
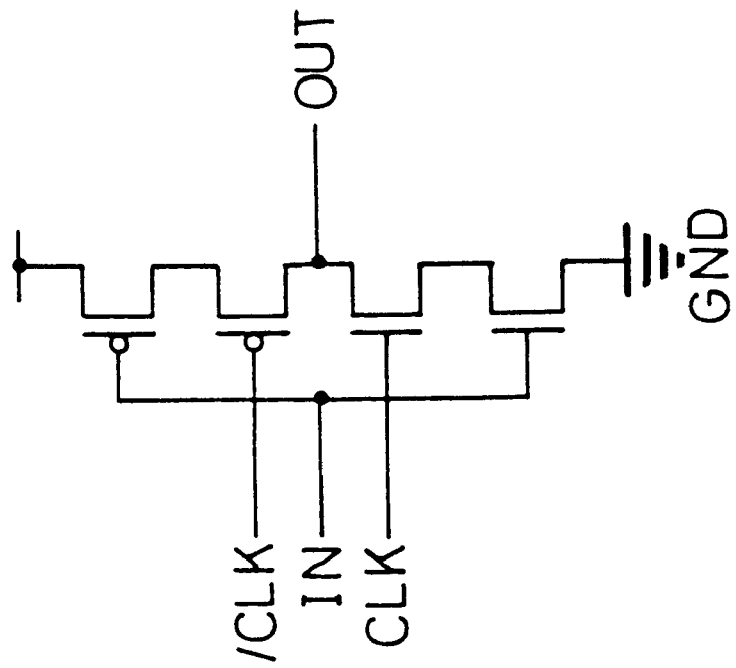
FIG. 29(a) is a drawing that shows a clock inverter in the shift register of FIG. 27.
FIG. 29(b) is a circuit diagram showing the internal structure of FIG. 29(a).
Figure 29:
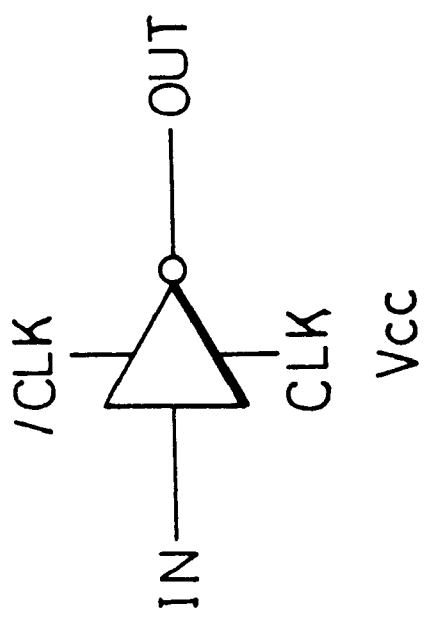

The following is a detailed description of the arrangements of the respective parts: For example, the shift register SR is shown in FIG. 27. This shift register SR is constituted of an inverter circuit, which is shown in FIG. 28(a) or FIG. 28(b), and a clock inverter circuit, which is shown in FIG. 29(a) or FIG. 29(b). These inverter circuits, which are well known in the art, are logical circuits for inverting the polarity of the input signal.

The above description concerns the commonly used driving circuit, and conventionally, these scanning-signal-line driving circuit and data-signal-line driving circuit are respectively constituted of ICs that are externally installed. In recent years, however, in order to meet demands for improvement in the driving performance of switching devices as well as for reduction in assembling costs of the above-mentioned driving-use ICs and other demands that are raised to satisfy the current trend for large screens, a technology has been reported wherein a pixel array and the driving circuits are monolithically formed on a polycrystal silicon thin film.

The following description will return to the present embodiment again: Here, a driving circuit and a driving method, which will be discussed in this description, are not intended to be limited thereto, and other means may be adopted. For example, its sampling-signal generation means may be constituted by not a shift register circuit, but a circuit of the so-called decoder type.

The driving circuit 2 is provided with a data driver 21a and a scanning driver 22a, which respectively drive data-signal lines and scanning-signal lines that are connected to the liquid crystal elements 11 of the first pixel group, and a control circuit 23a which releases control signals for controlling the data driver 21a and the scanning driver 22a.

The driving circuit 2 is also provided with a data driver 21b and a scanning driver 22b, which respectively drive data signal lines and scanning signal lines that are connected to the liquid crystal elements 11 of the second pixel group, and a control circuit 23b which releases control signals for controlling the data driver 21b and the scanning driver 22b.

In the above-mentioned arrangement, the first picture signal and the second picture signal are respectively inputted to the data drivers 21a and 21b, and the first synchronous signal and the second synchronous signal are respectively inputted to the control circuits 23a and 23b.

The data driver 21a and the scanning driver 22a drive the first pixel group of the display section 1 in accordance with the control signal released from the control circuit 23a. Thus, images corresponding to the first image signal are displayed on the first pixel group.

On the other hand, the data driver 21b and the scanning driver 22b drive the second pixel group of the display section 1 in accordance with the control signal released from the control circuit 23b. Thus, images corresponding to the second picture signal are displayed on the second pixel group.

Figure 3:
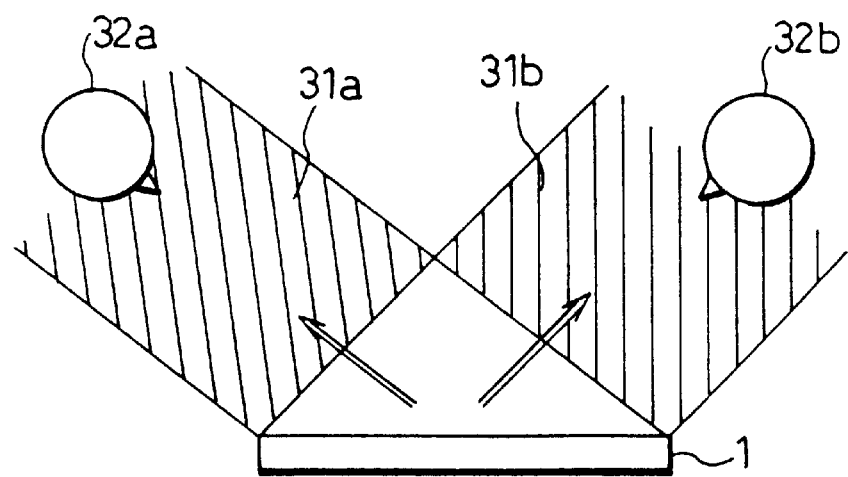
FIG. 3 is an explanatory drawing that shows a display section having two pixel groups.

The viewing angles of the first and second pixel groups are set to $+\phi$ and $-\phi$ respectively as described earlier. Therefore, as shown in FIG. 3, people 32a, who are within a crosshatched area 31a that is in the vicinity of the line of sight of $+\phi$, can see only the images displayed on the first pixel group, while people 32b, who are within a crosshatched area 31b that is in the vicinity of the line of sight of $-\phi$ can see only the images displayed on the second pixel group. Here, it is not necessarily required to set the absolute values of the viewing angles of the first and second pixel groups to the same value.

As described above, with the liquid crystal display of the present embodiment, it is possible to display two images on a single display section 1 at the same time. In addition, since the time-sharing displaying method is not adopted, it is possible to obtain fine images that are free from flickers. Moreover, it is possible to select desired images merely by changing places from which the display section 1 is viewed. This eliminates the necessity of having to wear conventional glasses with a shutter and their inherent inconveniences.

Figure 4:
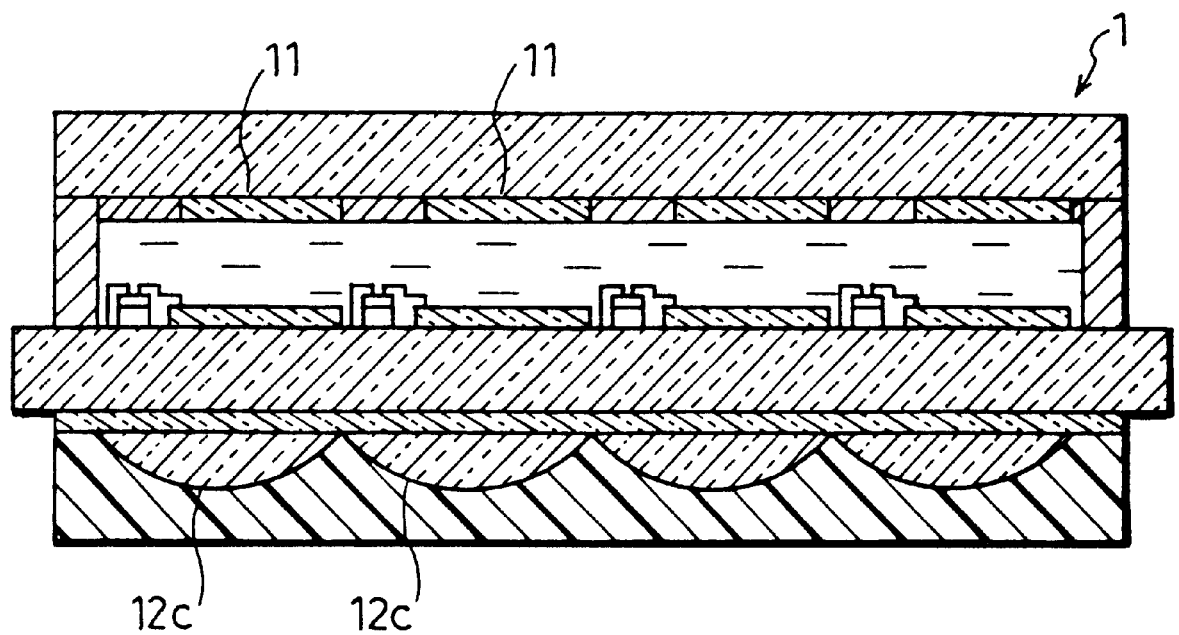
FIG. 4 is a vertical cross-sectional view showing another example of a display section in the liquid crystal display of FIG. 1.

It is possible to obtain the same functions and effects by adopting another arrangement, wherein the above-mentioned display section 1 has micro-lenses 12c of convex lens type that are placed in a shifted manner from the center line of the liquid crystal element 11 as shown in FIG. 4, instead of using the micro-lenses 12a and 12b.

Further, pixels having different viewing angles may also be provided by using the prior-art pixel-dividing technology, instead of using the micro-lenses 12a and 12b or the micro-lens 12c.

Figure 5:
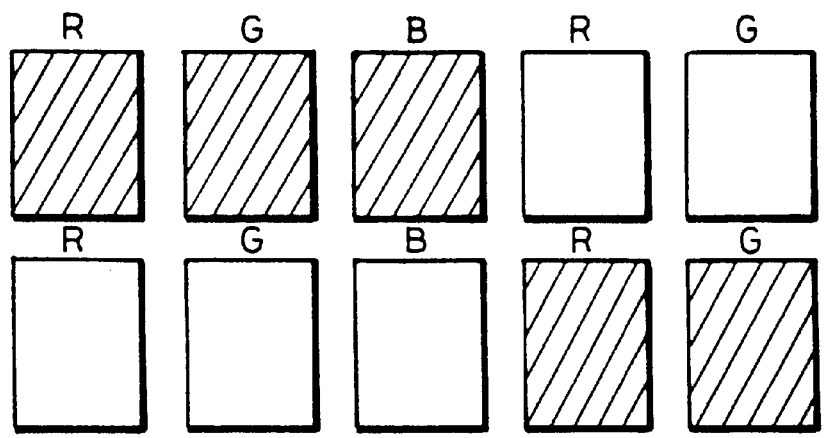
FIG. 5 is an explanatory drawing that shows one example of a disposition of three picture elements, R, G and B.

In the case of color displays, each pixel is constituted of three picture elements corresponding to the R(red)G(green) B(blue). In this case also, the viewing angles of the pixels are alternately set to +φ and −φ as shown in FIG. 5. In other words, the viewing angles of the pixels are alternately set to +φ and −φ, with each pixel having a set of the three picture elements corresponding to the RGB. In FIG. 5, the viewing angle of the picture elements that are indicated by cross-hatched areas is set to +φ, and the viewing angle of the picture elements indicated by non-cross-hatched areas is set to −φ.

Moreover, in FIG. 5, the description was given on the arrangement wherein the viewing angles of the adjacent pixels are alternately switched; however, the present invention is not limited to this arrangement, and another arrangement may be adopted. Additionally, in FIG. 5, the RGB arrangement of the stripe construction is shown; however, the present embodiment is not limited to this construction, and for example, the RGB arrangement of the delta construction may be adopted.

Figure 6:
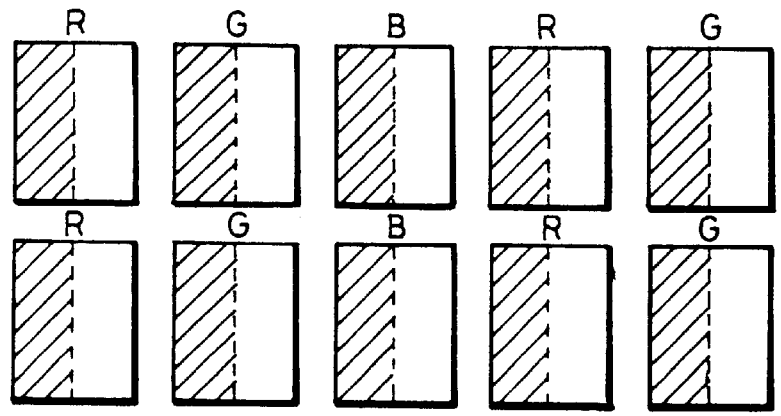
FIG. 6 is an explanatory drawing that shows another example of a disposition of three picture elements, R, G and B.

Moreover, as shown in FIG. 6, each pixel may be divided into two areas of sub-pixels, and, for example, the viewing angle of the area on the left side may be set to +θ and the viewing angle of the area on the right side may be set to −θ. This arrangement enables multi-displays without causing degradation in the resolution of the image-displaying apparatus. Additionally, the present invention is not intended to be limited to this structure of the sub-pixels: another structure may be adopted.

Figure 7:
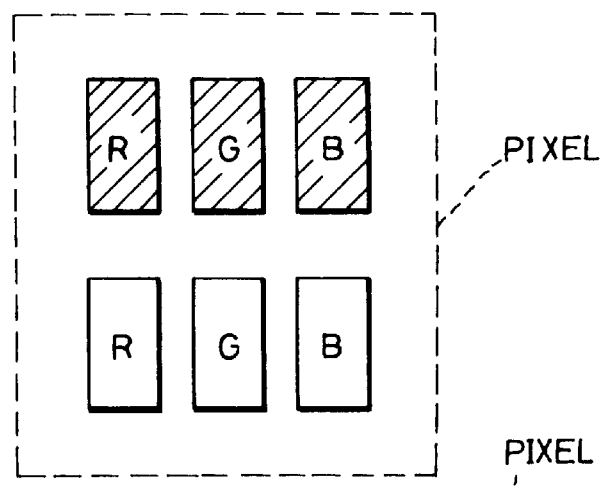
FIGS. 7(*a*) and 7(*b*) are explanatory drawings, each of which shows a structural example of sub-pixels.
Figure 7:
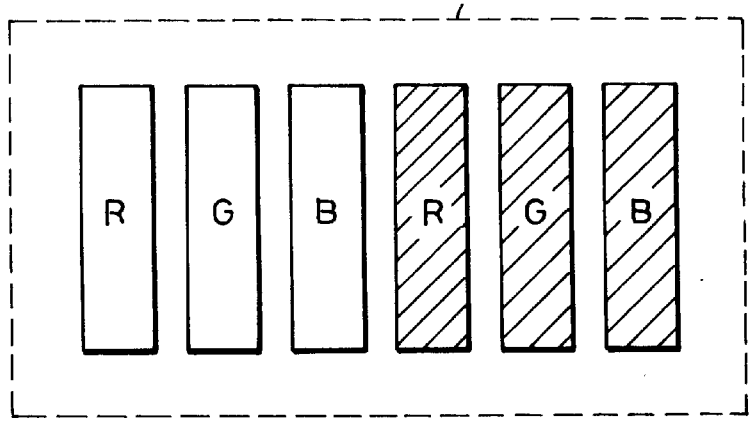

For example, it may be designed as shown in FIG. 7(*a*) or FIG. 7(*b*).

Moreover, in the case where the viewing angles of the entire screen are switched, except for a case where the viewing angle of one portion of the display section 1 is switched, it is preferable to have virtually the same structure of the sub-pixels in all the pixels because the image quality of displayed images, in particular, the resolution thereof, is uniformly settable, independent of the source of picture signals or independent of angles from which the screen is viewed.

As for an example of the case where the viewing angle of one portion of the display section 1 is different from that of the others, there is proposed a case where only specific people are allowed to view specific character information, that is, the specific character information is viewed only from a specific position.

Additionally, in the above explanation, the terms, sub-pixel, pixel and picture element, are used; however, the various matters of these elements, such as the signal supply, driving method and viewing angle, are in common with one another, except that the sub-pixel construction does not cause degradation in the resolution and quality of displayed images. For this reason, in the following description, although an explanation will be given by reference to pixels or sub-pixels, the explanation is of course applied to picture elements as well as pixels and sub-pixels, in the same manner.

Figure 8:
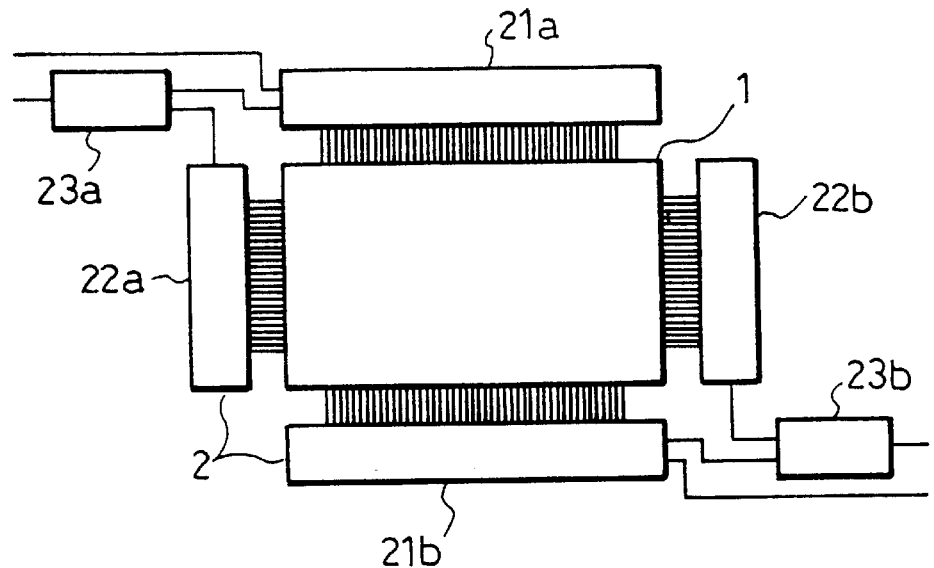
FIG. 8 is an explanatory drawing that shows one example of a layout of respective parts in a liquid crystal display.

The data drivers 21a and 21b, the scanning drivers 22a and 22b, and the control circuits 23a and 23b, which are disposed on one side of the display section 1 as shown in FIG. 1, may be disposed on both sides of the display section 1 as shown in FIG. 8.

Figure 9:
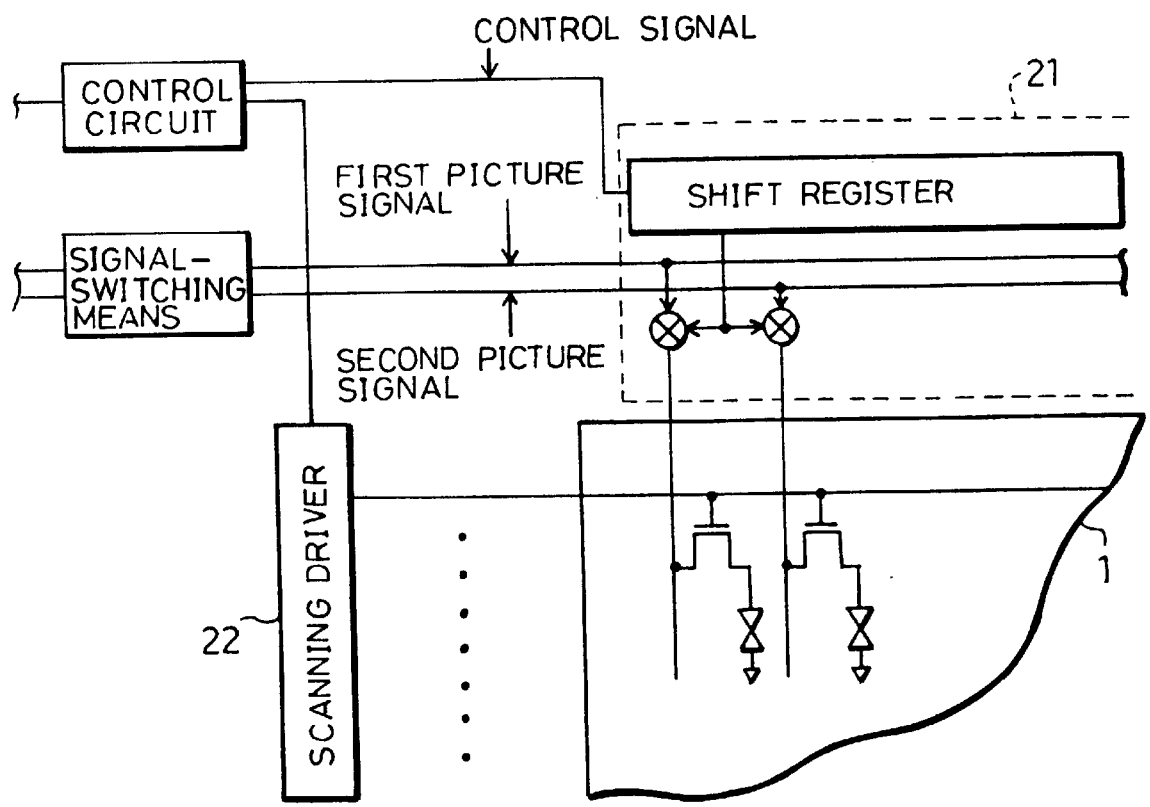
FIG. 9 is a block diagram showing another arrangement of the liquid crystal display.

Moreover, in the driving circuit 2, it is possible to simplify the driving circuit by allowing the scanning drivers, data drivers, control circuits and other devices to be respectively used in a shared manner. For example, as shown in FIG. 9, the shift register circuit, which specifies sampling positions of image signals, may be used in the data driver in a shared manner; thus, it becomes possible to simplify the data drivers into one driver. Here, image signals from two systems are inputted to the data driver 21, and by using a switching signal released from the shift register in the data driver 21, signals are sampled on the basis of each data line. In other words, since the sampling time and other factors have the same synchronization in the two systems, no problem is raised even if the above-mentioned means is adopted, as long as the timing of the vertical and horizontal synchronizations of the picture signals of the two systems are the same.

Figure 10:
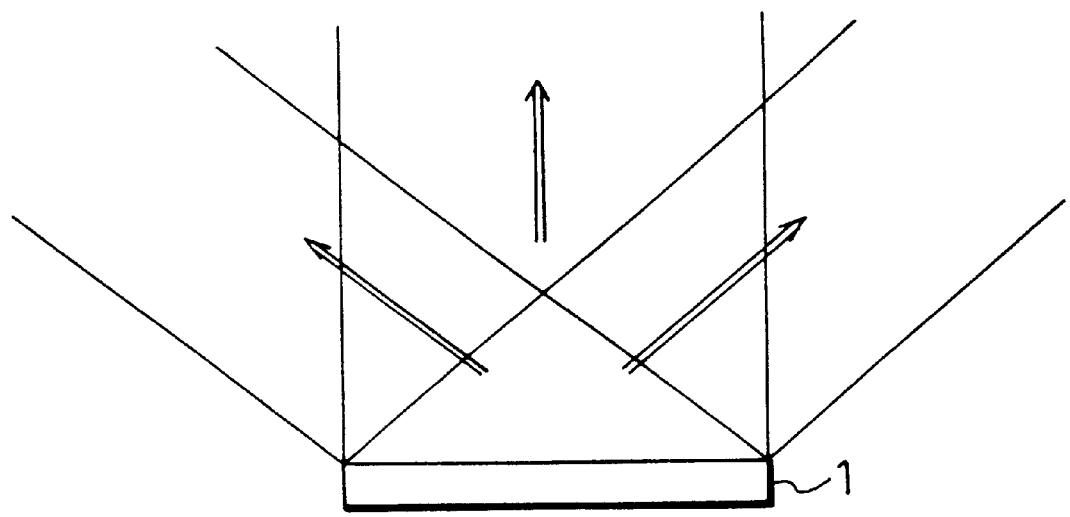
FIG. 10 is an explanatory drawing that shows a display section having three pixel groups.

In the above-mentioned embodiment, the explanation has been given on the display section 1 that has two pixel groups; however, three or more groups of pixels elements may be installed as shown in FIG. 10. This arrangement makes it possible to display three or more images at the same time. In addition, since the time-sharing displaying method is not adopted, it is possible to obtain fine images that are free from flickers irrespective of the number of images. Moreover as described earlier, it is possible to select desired images merely by changing places from which the display section 1 is viewed. This eliminates the necessity of having to wear conventional glasses with a shutter and their inherent inconveniences.

Here, in FIG. 9, at the preceding stage of the data driver 21, is provided a switching means for switching picture signals, that is, a means for making a switchover as to whether pieces of different information are respectively transferred to the picture-signal lines of two systems or pieces of the same information are transferred to them. This makes it possible for a plurality of viewers to readily see the same image.

Figure 11:
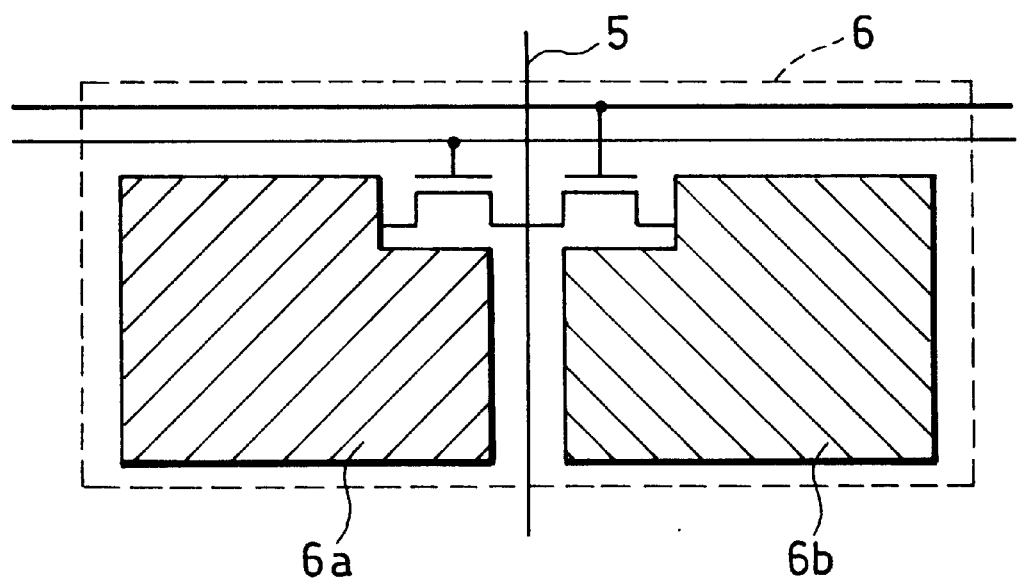
FIG. 11 is an explanatory drawing that shows a case where video signals from two systems are written to two sub-pixels in a time-sharing manner by using the same picture signal line.

Furthermore, as shown in FIG. 11, the transferring process of image signals may be carried out on a time-sharing basis by transferring the picture signals of the two systems to a pixel 6 having sub-pixels 6a and 6b whose viewing angles are different from each other through the same image signal line 5. As a result, it becomes possible to reduce the number of interfaces for connecting a panel and external substrates, thereby making it possible to improve the reliability in connections. This arrangement is of course applicable to a case where the number of sub-pixels is not less than two in one pixel, and in this case, images corresponding to the number of the sub-pixels are of course displayed at the same time. In this case also, the images to be written to the sub-pixels may be the same, or as occasion demands, the switchover is made easily between the same picture signal and different picture signals.

With this arrangement, displays are made without giving adverse effects on the resolution of the displaying apparatus. Thus, it becomes possible to reduce the circuit size and the number of elements of the driving circuit 2, to improve the cost and yield of the liquid crystal display, and also to achieve the compactness and light weight of the liquid crystal display.

Furthermore, the driving circuit and the driving method to be adopted here are not intended to be limited to the above-mentioned means and method. Another means may be adopted; for example, a circuit of the so-called decoder type may be adopted as the sampling-signal generation means in place of the sift register, and no problem is raised from this arrangement.

Moreover, the signal-switching means may also be formed monolithically on the same substrate with the display section 1; this makes it possible to further miniaturize the liquid crystal display. Furthermore, the generation of flicker can be further reduced by inverting the polarities of voltages to be applied to the liquid crystal elements 11 of the respective pixel groups in appropriate cycles.

Figure 12:
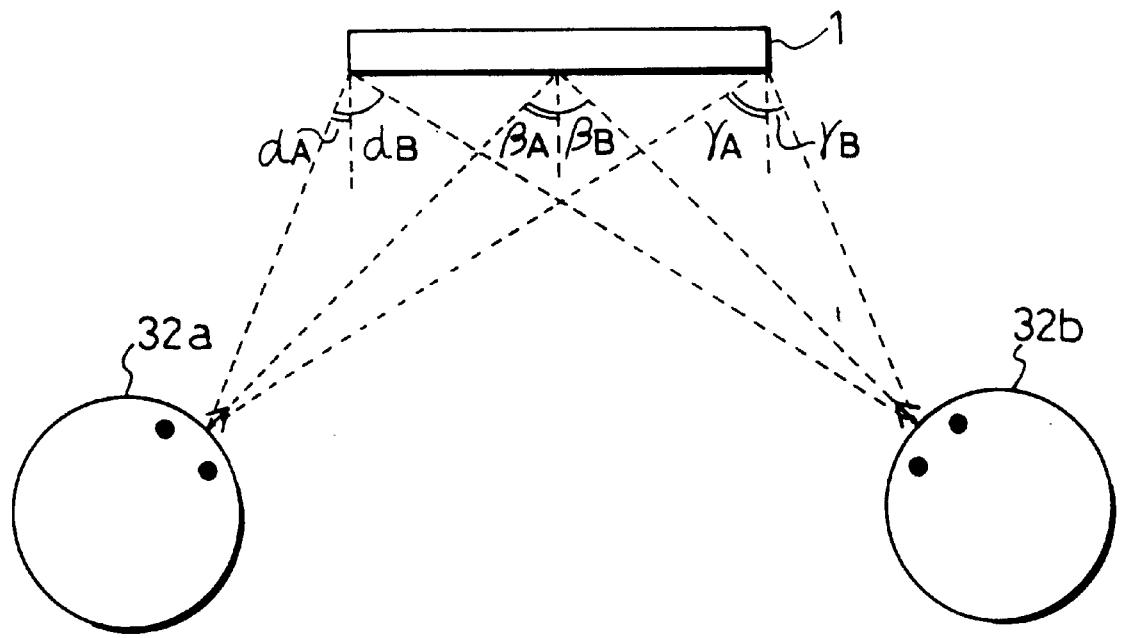
FIG. 12 is an explanatory drawing that shows a display section whose viewing angle is changing gradually.

Here, as shown in FIG. 12, the angle, which is made by the normal of the display section 1 and the line of sight through which a person 32a on the left side views the display section 1, varies from $\alpha_A$ to $\gamma_A$ through $\beta_A$. The angle at which a person 32b on the right side views the display section 1 varies from $\alpha_B$ to $\gamma_B$ through $\beta_B$.

In the case when the screen size of the display section 1 is small or in the case when the distance from the people 32a and the people 32b to the display section 1 is long, $\alpha_A \cong \beta_A \cong \gamma_A$ and $\alpha_B \cong \beta_B \cong \gamma_B$ hold. Therefore, the viewing angle of all the pixels constituting the first pixel group is preferably set to $\alpha_A$ and the viewing angle of all the pixels constituting the second pixel group is preferably set to $\alpha_B$.

In contrast, in the case when the screen size of the display section 1 is large or in the case when the distance from the people 32a and the people 32b to the display section 1 is short, $\alpha_A < \beta_A < \gamma_A$ and $\alpha_B > \beta_B > \gamma_B$ hold. Therefore, it is preferable to set the viewing angle of the pixels constituting the first pixel group so as to gradually vary from $\alpha_A$ to $\gamma_A$ through $\beta_A$ in accordance with the corresponding position on the display section 1, as well as to set the viewing angle of the pixels constituting the second pixel group so as to gradually vary from $\alpha_B$ to $\gamma_B$ through $\beta_B$ in accordance with the corresponding position on the display section 1.

Moreover, in the above-mentioned embodiment, a plurality of images are displayed on all the screen by locating a plurality of pixel groups on the display section 1 in a mixed manner; however, a plurality of groups of pixels may be installed without having overlapped portions.

Figure 13:
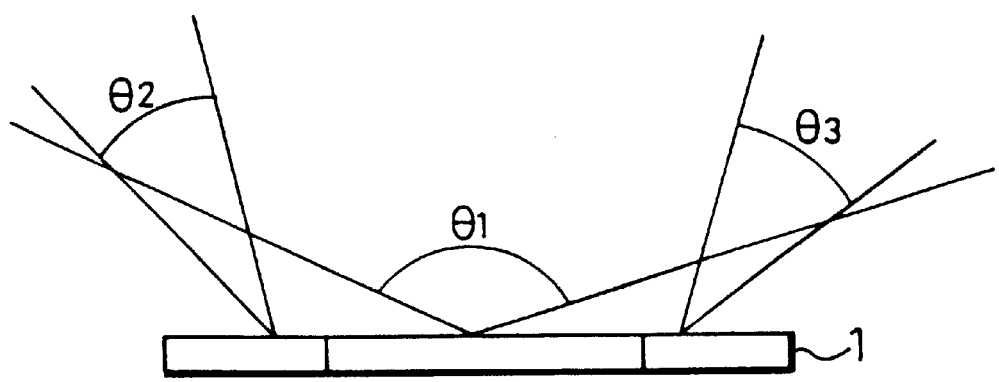
FIG. 13 is an explanatory drawing that shows a display section having pixel groups that are separated from one another.

For example, as shown in FIG. 13, the first pixel group may be installed in the center of the display section 1, and the second and third pixel groups may be installed on both sides of the first pixel group. In this display section 1, the viewing-field angle $\theta_1$ of the pixels constituting the first pixel group is provided as a wide viewing-field angle of not less than 90 degrees, and the viewing-field angles $\theta_2$ and $\theta_3$ of the pixels constituting the second and third pixel groups are provided as narrow viewing-field angles. With this arrangement, people on the left side of the display section 1 are allowed to view images that belong to the first and second pixel groups, and people on the right side of the display section 1 are allowed to view images that belong to the first and third pixel groups. In other words, although images can be shared with respect to the first pixel group, those images on the opposite side can not be seen from this side with respect to the second and third pixel groups. Here, the viewing-field angle is referred to as an angle indicating a range in which light from the liquid crystal elements 11 is effectively viewed.

By utilizing this feature, it becomes possible to deal with private information and highly-classified information amid the general public. Further, this feature provides a display screen that is preferably used for games, such as card games wherein one does not want his cards to be seen by the other members. Additionally, in the case of installing a plurality of pixel groups without having overlapped portions, it is possible to simplify the circuit configuration since there is no need of releasing different image signals to the respective pixel groups.

Next, an explanation will be given on a method for switching the viewing angles of the displaying apparatus, that is, a method for making switchovers as to whether many unspecified people are allowed to access certain image information, or only an individual or only a few people are allowed to access certain meaningful information. Basically this method can be achieved by applying the aforementioned method of multi-displays.

In this arrangement, in the case of dealing with information which should not be given to others at public places, the image signal is inputted to the control circuit 23a. The data driver 21a and the scanning driver 22a drive the first pixel group of the display section 1 in accordance with a control signal released from the control circuit 23a. Thus, images corresponding to the image signal are displayed on the first pixel group.

In contrast, in the case of dealing with information which should be given to a plurality of people at a conference room or other places, the image signal is inputted to the control circuit 23b. The data driver 21b and the scanning driver 22b drive the second pixel group of the display section 1 in accordance with a control signal released from the control circuit 23b. Thus, images corresponding to the image signal are displayed on the second pixel group.

Figure 14:
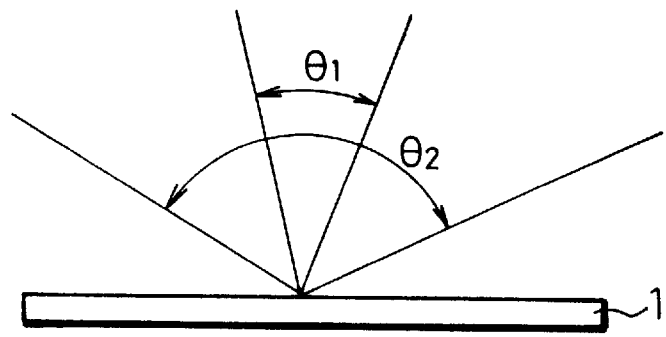
FIG. 14 is an explanatory drawing that shows a display section having two pixel groups.

The viewing angles of the first and second pixel groups are respectively set to $\theta_1$ and $\theta_2$ which satisfy $\theta_1 < \theta_2$, as described earlier. For this reason, as shown in FIG. 14, the images, displayed on the first pixel group, can be seen only from a narrow range, while the other images, displayed on the second pixel group, can be seen from a wide range. In other words, the images, displayed on the first pixel group, can hardly be seen by other people, while the other images, displayed on the second pixel group, can be seen by the surrounding people.

Figure 15:
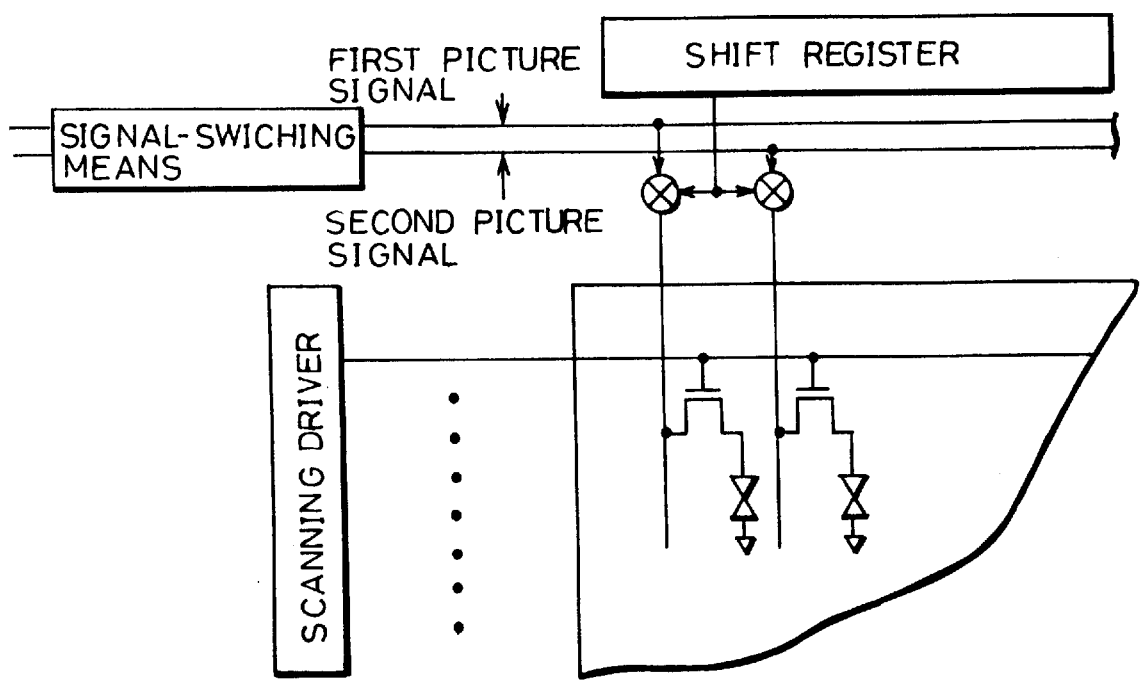
FIG. 15 is a block diagram showing another example of the arrangement of the liquid crystal display of FIG. 1.

Moreover, the driving circuit 2 may be designed as shown in FIG. 15 so that the shift register circuit for specifying a sampling position may be sharedly used in both the first pixel group and the second pixel group. In this case, if displays are made only on one of the pixel groups, a switching means that specifies which pixel group to be written to (pixel group for display) may be installed, or which picture signal to be inputted to the pixel group on the non-displaying side may be given as a constant-level signal.

Furthermore, in the case of sharing certain information among all the people, the same picture signal may be supplied as the first picture signal and the second picture signal, and in the case of displaying information that is confidential to other people, different picture signals are respectively supplied to the pixel groups.

Figure 16A:
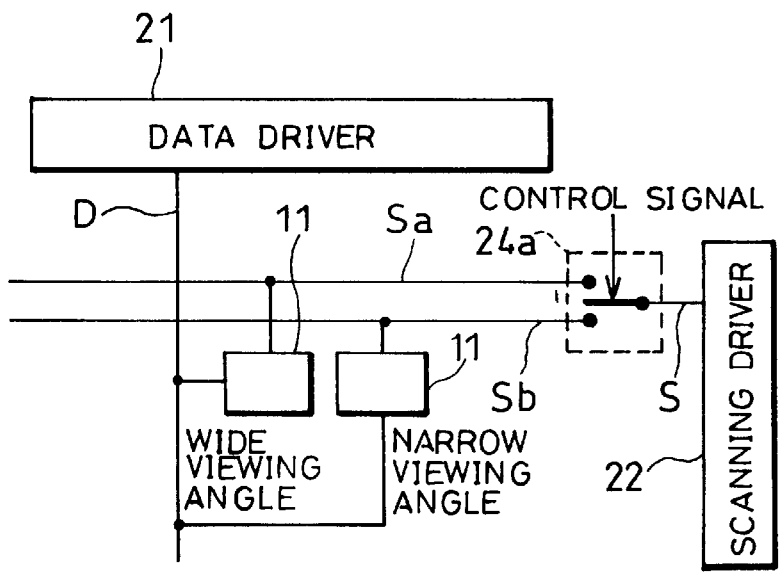
FIGS. 16(a) and 16(b) are block diagrams showing other examples of the arrangement of the liquid crystal display of FIG. 1.

Moreover, as shown in FIG. 16(a), the driving circuit 2 may be designed so that: the liquid crystal element 11 belonging to the first pixel group is connected between the data-signal line D and a line Sa; the liquid crystal element 11 belonging to the second pixel group, which corresponds to the liquid crystal element 11 belonging to the first pixel group, is connected between the data-signal line D and a line Sb; and a switching circuit 24a, which connects the scanning-signal line S to the line Sa or the line Sb, is installed. With this arrangement, the first pixel group and the second pixel group are selectively driven by switching the switching circuit 24a; therefore, this arrangement requires only one data driver 21 and one scanning driver 22 respectively.

Figure 16B:
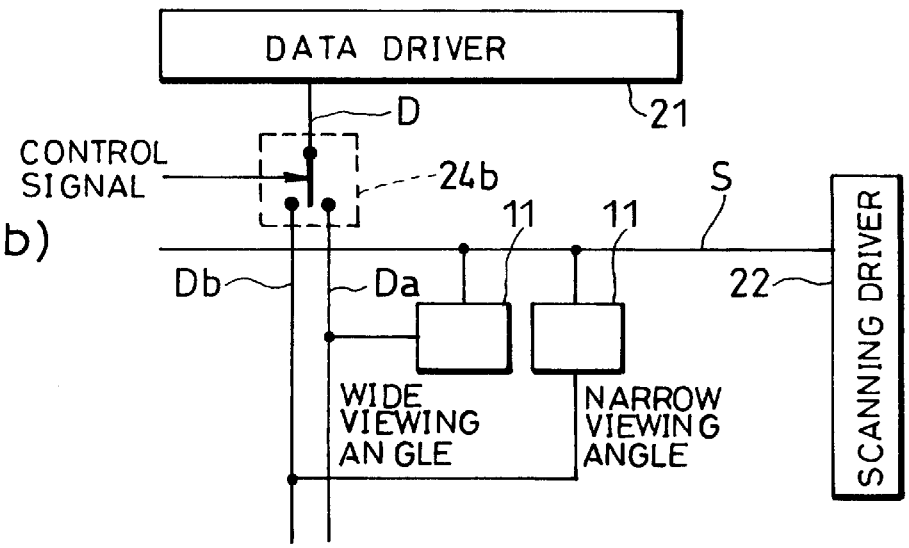

Furthermore, as shown in FIG. 16(b), the driving circuit 2 may be designed so that: the liquid crystal element 11 belonging to the first pixel group is connected between a data-signal line Da and the line S; the liquid crystal element 11 belonging to the second pixel group, which corresponds to the liquid crystal element 11 belonging to the first pixel group, is connected between a data-signal line Db and the line S; and a switching circuit 24b, which connects the data-signal line D to the line Da or the line Db, is installed. With this arrangement, the first pixel group and the second pixel group are selectively driven by switching the switching circuit 24b in the same manner as described above; therefore, this arrangement requires only one data driver 21 and one scanning driver 22 respectively.

Figure 17:
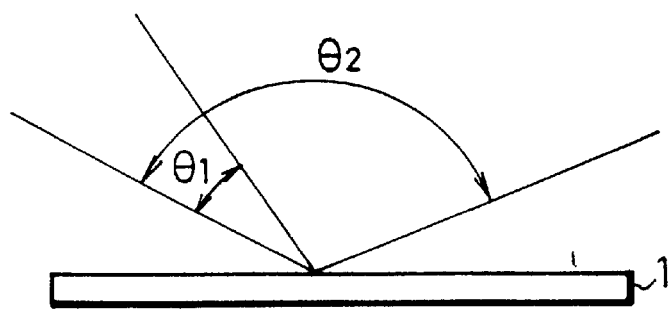
FIG. 17 is an explanatory drawing that shows a display section which has two pixel groups whose viewing angles are different from each other.
Figure 18:
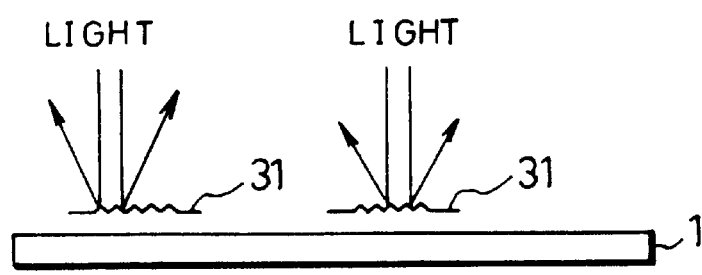
FIGS. 18(a) and 18(b), which show another embodiment of the present invention, are explanatory drawings which show one example of display sections whose viewing-field angles can be switched.
Figure 18:
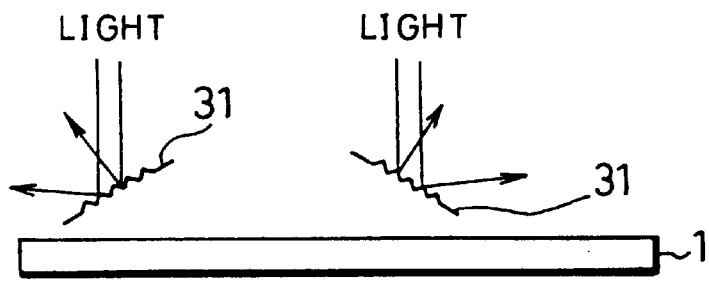
Figure 19:
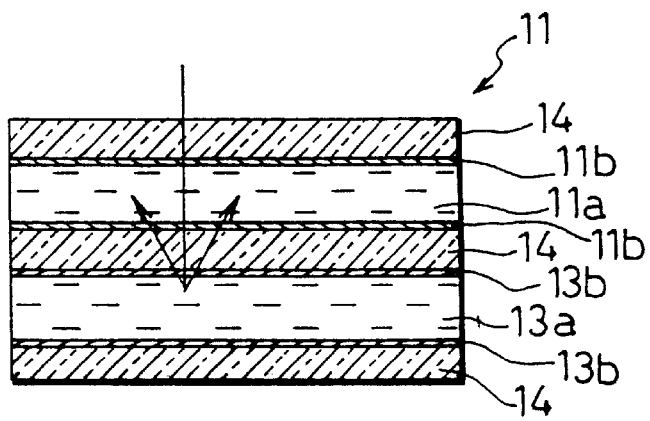
FIGS. 19(a) and 19(b) are explanatory drawings which show another example of display sections whose viewing-field angles can be switched.
Figure 19:
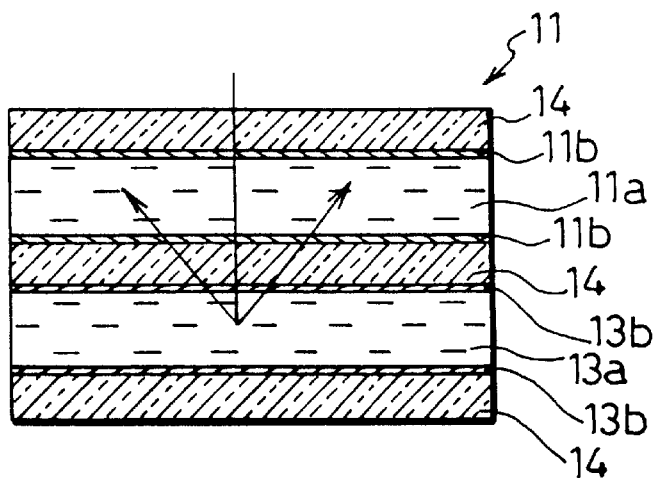

In the above-mentioned embodiment, the viewing angle of the first pixel group with a viewing-field angle of $\theta_1$ and the viewing angle of the second pixel group with a viewing-field angle of $\theta_2$ are set to be coincident with each other; however, only the viewing angle of the first pixel group may be set to be greater, as shown in FIG. 17. With this arrangement, the images of the first pixel group become less visible to the other people. Here, the viewing angle is an angle at which light from the liquid crystal elements 11 is viewed most effectively, and is indicated by an angle made with respect to the normal of the display section 1.

Referring to FIGS. 18 through 21, the following description will discuss another embodiment of the present invention. Here, for convenience of explanation, those members that have the same functions and that are described in the aforementioned embodiment with reference to its drawings are indicated by the same reference numerals and the description thereof is omitted.

The liquid crystal display of the present embodiment is different from that of the aforementioned embodiment in that it is provided with a display section 1 consisting of pixels whose viewing-field angles can be switched.

In the display section 1 of FIGS. 18(a) and 18(b), a reflection plate 31 is installed on each liquid crystal element 11, and its viewing-field angle is switched by changing the inclination of the reflection plate 31. The reflection plate 31, which is made of a reflection electrode having a reflection surface, is manufactured by micromachine technology. When no voltage is applied to the reflection electrode, the reflection plate 31 remains in parallel with the display section 1, as shown in FIG. 18(a). Therefore, the viewing-field angle is narrow. When a voltage is applied to the reflection electrode, the reflection plate 31 inclines with respect to the display section 1 as shown in FIG. 18(b). As a result, the viewing-field angle is widened.

Additionally, if the display section 1 is that of the direct-viewing type, it is preferable for the reflection surface of the reflection electrode to have protrusions and recessions than to have a completely flat mirror-like face.

In the display section 1 shown in FIGS. 19(a) and 19(b), the second liquid crystal layer 13a, whose scattering state is controllable, is inserted into the liquid crystal element 11, and the viewing-field angle is switched by changing the scattering state of the liquid crystal layer 13a.

Each liquid crystal element 11 is constituted by successively stacking a substrate 14, an electrode 11b, a liquid crystal layer 11a, an electrode 11b, a substrate 14, an electrode 13b, the second liquid crystal layer 13a, an electrode 13b, and a substrate 14. The upper liquid crystal layer 11a, which is used for displaying, is settable to a light-transmitting state or a shaded state (or a light-scattering state). The lower liquid crystal layer 13a, which is used for switching the viewing-field angle, is allowed to change in its light-scattering state through the application of voltage across the upper and lower electrodes 13b. For example, liquid crystal of the polymer dispersion type is preferably used as the liquid crystal layer 13a.

The upper and lower electrodes 13b of all the liquid crystal elements 11 can be connected to two common lines respectively. Further, one of the common lines can be connected to the common electrode 11b of the liquid crystal layers 11a.

Here, each liquid crystal element 11 may be constituted by forming two liquid crystal cells independently and bonding them to each other, or may be provided by combining substrates into a three-layer structure. Moreover, liquid crystal layers of not less than three layers may be used. Furthermore, another means whose light-scattering state is controllable may be used in place of the lower liquid crystal layer 13a.

Figure 20:
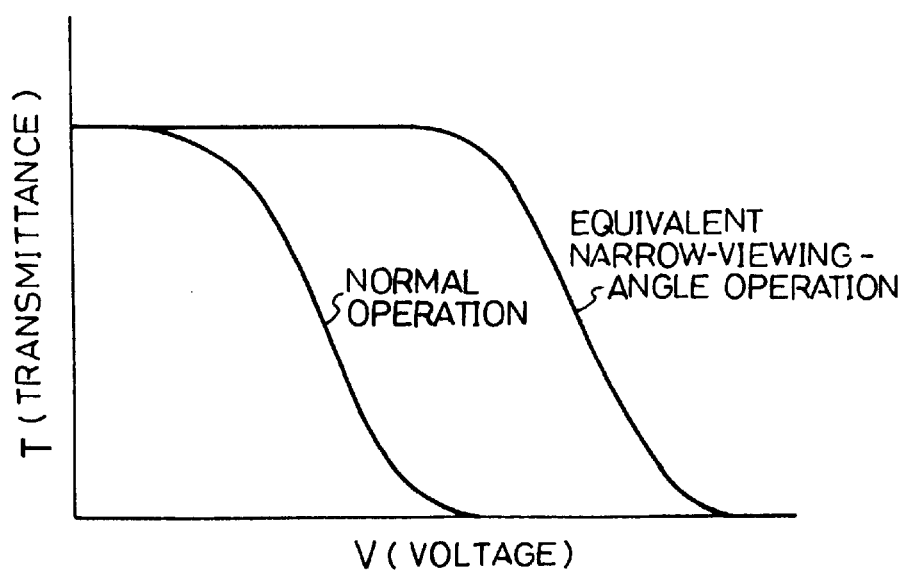
FIG. 20 is a graph showing the voltage versus light-transmittance (reflectance) characteristics of a liquid crystal element.

As for the switching method for the viewing-field angle, besides the above-mentioned method, another method may be used, wherein the phenomenon that voltage versus light transmittance (reflectance) characteristics vary depending on changes in the viewing angle of the liquid crystal elements 11 is utilized, as shown in FIG. 20. In this method, the viewing-field angle is controlled by applying step-wise voltages to the liquid crystal elements 11.

For pixels that are in the same viewing angle state, it is necessary to apply different voltages to the liquid crystal depending on directions in which the screen is viewed, in order to obtain optimal contrast. For this reason, it becomes possible to control the direction of the viewing angle by installing a means for switching the voltages to be applied to the liquid crystal, that is, the level of the picture signals or the opposing electric potential level, in a step-wise manner. More specifically, the step-wise switching means is constituted by a signal-amplification means (amplifier) for adjusting the level of the signals, or a signal-attenuation means (attenuator).

Figure 21:
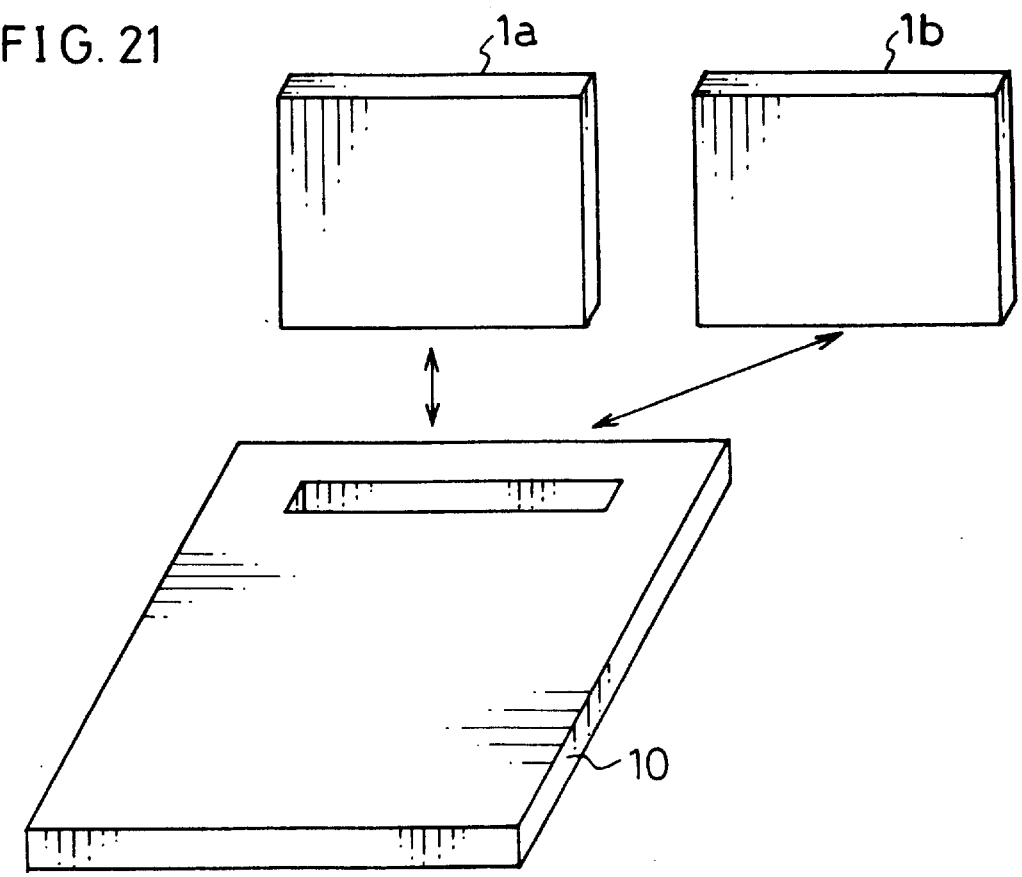
FIG. 21 is an explanatory drawing of a liquid crystal display wherein display sections having different viewing-field angles can be exchangeably inserted.
Figure 22A:
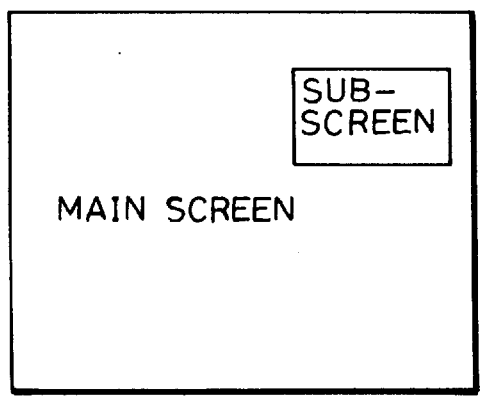
FIGS. 22(a) and 22(b) are explanatory drawings which show conventional TV screens with sub-screen(s)
Figure 22B:
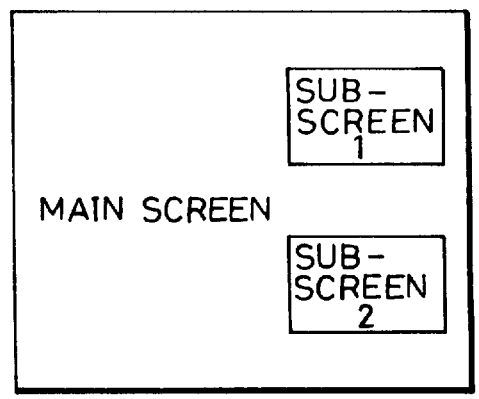

Moreover, another method for switching the viewing-field angle, which is completely different from the above-mentioned method for switching the viewing-field angle, may be adopted, wherein as shown in FIG. 21, a display section 1a having a narrow viewing-field angle and a display section 1b having a wide viewing-field angle are prepared in a separate manner from the main body 10 of a liquid crystal display and the switching of the viewing-field angle is carried out by exchangeably inserting these display sections.

The transferring process for data and the supply of power from the main body 10 to the display section 1a or to the display section 1b may be carried out by using electric connections; however, either of them or both of them may be carried out by using optical connections. Since the optical connections are non-contact connections, it becomes possible to reduce the destruction of the display sections 1a and 1b due to the replacing processes.

In the above-mentioned embodiments, the image-displaying apparatus has been exemplified by a liquid crystal display; however, the present invention is applicable to other image-displaying apparatuses.

In all the above-mentioned embodiments, it is possible to form the driving circuit monolithically on the same substrate with the display section, and it is effective to use p-Si-TFT-LCDs wherein the data driver and the scanning driver are monolithically formed therein, and also to use LCDs wherein transistors are formed on a mono-crystal silicon substrate. In particular, in the aforementioned examples of a displaying apparatus wherein picture signals from two systems are written to sub-pixels using the same picture-signal line and a displaying apparatus wherein the display section and the driving section are replaceable, it is more preferable to form the above-mentioned elements monolithically so as to reduce the number of interfaces and expand the packaging pitch of interfaces. This arrangement also results in improved reliability and cost reduction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-displaying apparatus comprising:

a display section which is constituted of a plurality of pixels disposed in the form of a matrix, said pixels being divided into a plurality of pixel groups, said pixel groups including at least a first pixel group for displaying an image which corresponds to a first image signal, and a second pixel group for displaying an image which corresponds to a second image signal whose content is different from, or the same as, said first image signal, wherein each of said pixel groups is constituted of pixels having the same viewing angle, and the viewing angle of the pixels belonging to said first pixel group is different from that of the pixels belonging to said second pixel group, so as to be capable of displaying first and second respective images which are adapted to be viewed by different persons, the image perceived dependent only upon viewing angles from which the images are viewed, and not a distance from the display, wherein pixels, which belong to the first pixel group or the second pixel group, are provided as sub-pixels that are paired, and contents of images displayed on the respective sub-pixels are freely selectable between the same contents and different contents, and wherein the pixel groups have regions that are disposed in overlapping manner with each other.

2. The image-displaying apparatus as defined in claim 1, further comprising:

control means for controlling the viewing-field angles of the pixels.

3. The image-displaying apparatus as defined in claim 2, wherein a structure of the sub-pixels is identical in all the pixels.

4. The image-displaying apparatus as defined in claim 2, wherein each of the pixels or sub-pixels that have the different viewing angles is constituted of liquid crystal, which is placed in each pixel or sub-pixel and which scatters or transmits light from the pixel or the sub-pixel, and a voltage-applying means which changes the state of the liquid crystal by applying voltage to the liquid crystal.

5. The image-displaying apparatus as defined in claim 4, wherein the liquid crystal and the voltage-applying means are formed on the same substrate.

6. The image-displaying apparatus as defined in claim 2, wherein each of the pixels, connected between a data signal line and a scanning signal line, is provided with a scanning driver for successively selecting scanning signal lines and a data driver for releasing image signals to data signal lines, with the pixel, the scanning driver and the data driver being monolithically formed on the same substrate.

7. The image-displaying apparatus as defined in claim 2, wherein the pixels or sub-pixels having the different viewing angles are constituted of reflection plates, each of which is installed in each pixel or sub-pixel and reflects light from the pixel or the sub-pixel, wherein the reflection plate is divided into a plurality of portions.

8. The image-displaying apparatus as defined in claim 1, wherein a structure of the sub-pixels is identical in all the pixels.

9. The image-displaying apparatus as defined in claim 1, wherein the pixels have the same disposition in the respective pixel groups.

10. The image-displaying apparatus as defined in claim 1, wherein the pixels or sub-pixels having the different viewing angles are constituted of reflection plates, each of which is installed in each pixel or sub-pixel and reflects light from the pixel or the sub-pixel.

11. The image-displaying apparatus as defined in claim 10, wherein the reflection plate is divided into a plurality of portions.

12. The image-displaying apparatus as defined in claim 1, wherein each of the pixels or sub-pixels that have the different viewing angles is constituted of liquid crystal, which is placed in each pixel or sub-pixel and which scatters or transmits light from the pixel or the sub-pixel, and a voltage-applying means which changes the state of the liquid crystal by applying voltage to the liquid crystal.

13. The image-displaying apparatus as defined in claim 12, wherein the liquid crystal and the voltage-applying means are formed on the same substrate.

14. The image-displaying apparatus as defined in claim 1, wherein each of the pixels, connected between a data signal line and a scanning signal line, is provided with a scanning driver for successively selecting scanning signal lines and a data driver for releasing image signals to data signal lines, with the pixel, the scanning driver and the data driver being monolithically formed on the same substrate.

15. The image-displaying apparatus as defined in claim 1, wherein each sub-pixel consists of picture elements of the displaying apparatus.

16. The image-displaying apparatus as defined in claim 15, wherein each of the sub-pixels consists of R, G and B picture elements of the displaying apparatus.

17. An image-displaying apparatus comprising:

a display section which is constituted of a plurality of pixels disposed in the form of a matrix, said pixels being divided into a plurality of pixel groups, said pixel groups including at least a first pixel group for displaying an image which corresponds to a first image signal, and a second pixel group for displaying an image which corresponds to a second image signal whose content is different from, or the same as, said first image signal, wherein each of said pixel groups is constituted of pixels having the same viewing-field angle, and the viewing-field angle of the pixels belonging to said first pixel group is different from that of the pixels belonging to said second pixel group, so as to be capable of changing a viewing-field angle of a displayed image;

wherein images in different viewing-fields are adapted to be viewed by different persons, the image perceived dependent only upon viewing angles from which the images are viewed, and not a distance from the display; and wherein each pixel of at least one portion is constituted of a plurality of sub-pixels that have viewing angles different from each other, and contents of images displayed on the respective sub-pixels are freely selectable between the same contents and different contents.

18. The image-displaying apparatus as defined in claim 17, further comprising:

control means for controlling the viewing-field angles of the pixels.

19. The image-displaying apparatus as defined in claim 18, wherein a structure of the sub-pixels is identical in all the pixels.

20. The image-displaying apparatus as defined in claim 18, wherein each of the pixels or sub-pixels that have the different viewing angles is constituted of liquid crystal, which is placed in each pixel or sub-pixel and which scatters or transmits light from the pixel or the sub-pixel, and a voltage-applying means which changes the state of the liquid crystal by applying voltage to the liquid crystal.

21. The image-displaying apparatus as defined in claim 20, wherein the liquid crystal and the voltage-applying means are formed on the same substrate.

22. The image-displaying apparatus as defined in claim 18, wherein each of the pixels, connected between a data signal line and a scanning signal line, is provided with a scanning driver for successively selecting scanning signal lines and a data driver for releasing image signals to data signal lines, with the pixel, the scanning driver and the data driver being monolithically formed on the same substrate.

23. The image-displaying apparatus as defined in claim 18, wherein the pixels or sub-pixels having the different viewing angles are constituted of reflection plates, each of which is installed in each pixel or sub-pixel and reflects light from the pixel or the sub-pixel, wherein the reflection plate is divided into a plurality of portions.

24. The image-displaying apparatus as defined in claim 17, wherein a structure of the sub-pixels is identical in all the pixels.

25. The image-displaying apparatus as defined in claim 17, wherein the pixels have the same disposition in the respective pixel groups.

26. The image-displaying apparatus as defined in claim 17, wherein the pixels or sub-pixels having the different viewing angles are constituted of reflection plates, each of which is installed in each pixel or sub-pixel and reflects light from the pixel or the sub-pixel.

27. The image-displaying apparatus as defined in claim 26, wherein the reflection plate is divided into a plurality of portions.

28. The image-displaying apparatus as defined in claim 17, wherein each of the pixels or sub-pixels that have the different viewing angles is constituted of liquid crystal, which is placed in each pixel or sub-pixel and which scatters or transmits light from the pixel or the sub-pixel, and a voltage-applying means which changes the state of the liquid crystal by applying voltage to the liquid crystal.

29. The image-displaying apparatus as defined in claim 28, wherein the liquid crystal and the voltage-applying means are formed on the same substrate.

30. The image-displaying apparatus as defined in claim 17, wherein each of the pixels, connected between a data signal line and a scanning signal line, is provided with a scanning driver for successively selecting scanning signal lines and a data driver for releasing image signals to data signal lines, with the pixel, the scanning driver and the data driver being monolithically formed on the same substrate.

31. The image-displaying apparatus as defined in claim 17, wherein each sub-pixel consists of picture elements of the displaying apparatus.

32. The image-displaying apparatus as defined in claim 31, wherein each of the sub-pixels consists of R, G and B picture elements of the displaying apparatus.

33. An image-displaying apparatus comprising:

a display section which is constituted of a plurality of pixels disposed in the form of a matrix, said pixels being divided into a plurality of pixel groups; and driving means for sending a signal based on a first image signal to a first pixel group of said pixel groups while sending a signal based on a second image signal to a second pixel group of said pixel groups, said second image signal being different from, or the same as, said first image signal, wherein each of said pixel groups is constituted of pixels having the same viewing angle, and the viewing angle of the pixels belonging to any pixel group is different from that of the pixels belonging to the other pixel groups;

wherein said pixel groups are adapted to be viewed by different persons, the image perceived dependent only upon viewing angles from which the pixel groups are viewed, and not a distance from the display;

wherein pixels, which belong to the first pixel group or the second pixel group, are provided as sub-pixels that are paired, and contents of images displayed on the respective sub-pixels are freely selectable between the same contents and different contents, and wherein the pixel groups have regions that are disposed in overlapping manner with each other.

34. The image-displaying apparatus as defined in claim 33, wherein the driving means includes a control circuit for releasing image signals to the respective pixel groups in a time-sharing manner.

35. The image-displaying apparatus as defined in claim 33, wherein each pixel is made up of a liquid crystal element and the driving means includes a means which applies driving voltages, each having a reversed polarity, to adjacent liquid crystal elements in the respective pixel groups.

36. The image-displaying apparatus as defined in claim 33, wherein the driving means includes a signal-switching means for inputting an image signal of a single source to a plurality of pixel groups.

37. The image-displaying apparatus as defined in claim 36, wherein the signal-switching means is monolithically formed on the substrate.

38. The image-displaying apparatus as defined in claim 36, wherein the driving means includes a data driver which is capable of driving a plurality of pixel groups by using a shift register of only one system.

39. The image-displaying apparatus as defined in claim 38, wherein the data driver is monolithically formed on the substrate.

40. The image-displaying apparatus as defined in claim 33, wherein each pixel is constituted by three picture elements corresponding to R, G and B.

41. An image-displaying apparatus comprising:

a display section which is constituted of a plurality of pixels disposed in the form of a matrix;

changing means for changing the viewing-field angle of the pixels, and driving means for sending image signals to the display section, wherein each pixel is made up of a liquid crystal element and the changing means controls the viewing-field angle by switching voltages to be applied to the liquid crystal elements in a step-wise manner; and wherein images in different viewing-fields are adapted to be viewed by different persons, the image perceived dependent only upon viewing angles from which the images are viewed, and not a distance from the display.

42. An image-displaying apparatus comprising:

a plurality of display sections, each of said display sections being constituted of a plurality of pixels disposed in the form of a matrix, and a viewing-field angle of the pixels in one display section being different from that of the pixels in another display section; and driving means for sending image signals to one of said display sections, wherein said plurality of display sections are exchangeably installed so as to change a viewing-field angle of a displayed image; and wherein images in different viewing-fields are adapted to be viewed by different persons, the image perceived dependent only upon viewing angles from which the images are viewed, and not a distance from the display.

* * * * *